United States Patent
Mutalik et al.

(10) Patent No.: US 12,315,028 B2
(45) Date of Patent: May 27, 2025

(54) METHOD AND ELECTRONIC DEVICE FOR BOOSTING GRAPHICS PERFORMANCE

(71) Applicant: SAMSUNG ELECTRONICS CO., LTD., Suwon-si (KR)

(72) Inventors: Sripurna Mutalik, Karnataka (IN); Manith Shetty, Karnataka (IN); Anuradha Kanukotla, Karnataka (IN); Sumeen Agrawal, Karnataka (IN); Narendra Mutyala, Karnataka (IN); Naresh Kumar Narasimma Moorthy, Karnataka (IN); Pavan Nittur, Karnataka (IN); Mayank Gupta, Karnataka (IN); Kwanjin Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/729,789

(22) Filed: Apr. 26, 2022

(65) Prior Publication Data
US 2022/0292627 A1     Sep. 15, 2022

Related U.S. Application Data

(63) Continuation of application No. PCT/KR2022/003226, filed on Mar. 8, 2022.

(30) Foreign Application Priority Data

Mar. 15, 2021 (IN) .............................. 202141010968
Jan. 11, 2022 (IN) .............................. 202141010968

(51) Int. Cl.
*G06T 1/20* (2006.01)
*G06F 3/0485* (2022.01)
(Continued)

(52) U.S. Cl.
CPC .............. *G06T 1/20* (2013.01); *G06F 3/0485* (2013.01); *G06F 3/14* (2013.01); *G06T 1/60* (2013.01); *G09G 2360/08* (2013.01)

(58) Field of Classification Search
CPC .. G06F 9/44578; G06F 9/445; G06F 9/44505; G06F 9/547; G06F 9/451;
(Continued)

(56) References Cited

U.S. PATENT DOCUMENTS 6,359,624 B1   3/2002   Kunimatsu
9,135,019 B2   9/2015   Chen et al.
(Continued)

FOREIGN PATENT DOCUMENTS

CN     106534519     3/2014
CN     106406966     4/2020

OTHER PUBLICATIONS

Search Report and Written Opinion issued Jun. 17, 2022 in counterpart International Patent Application No. PCT/KR2022/003226.
(Continued)

*Primary Examiner* — Xiao M Wu
*Assistant Examiner* — Scott E Sonners
(74) *Attorney, Agent, or Firm* — Nixon & Vanderhye, P.C.

(57) ABSTRACT

Disclosed is a method for boosting (e.g., improving) graphics performance of an electronic device. The method for boosting graphics performance of an electronic device comprises: determining a context of the electronic device for boosting the graphics performance, determining a current state of the electronic device, determining at least one graphics configuration of hardware components of the electronic device and at least one application of the electronic device based on the context of the electronic device and the current state of the electronic device and generating a virtual (Continued)

display for displaying the at least one application based on the at least one graphics configuration of the hardware components and the at least one application.

16 Claims, 34 Drawing Sheets

(51) Int. Cl.
*G06F 3/14* (2006.01)
*G06T 1/60* (2006.01)

(58) Field of Classification Search
CPC ...... G06F 9/485; G06F 9/5016; G06F 9/5038; G06F 11/302; G06F 11/3438; G06F 3/0484; G06F 3/0485; G06F 3/0488; G06F 3/04883; G06F 9/4843; G06F 9/5077; G06F 11/004; G06F 11/0712; G06F 11/34; G06F 11/3419; G06F 11/3433; G06F 12/08; G06F 12/0862; G06F 16/9574; G06F 3/0481; G06F 3/0482; G06N 20/00; G06N 3/08; G06T 1/60; G06T 1/20; G06T 11/00; G06T 11/60; G06T 2200/24; G06T 15/005; G06T 11/40; G06T 2200/28; G06T 2210/52; A63F 13/48
See application file for complete search history.

(56) References Cited

U.S. PATENT DOCUMENTS

| | | | |
|---|---|---|---|
| 9,317,212 | B2 | 4/2016 | Huffman et al. |
| 9,323,429 | B2 | 4/2016 | Lu et al. |
| 9,726,896 | B2 | 8/2017 | Von Und Zu Liechtenstein |
| 10,255,057 | B2 | 4/2019 | Clissold et al. |
| 10,459,887 | B1 * | 10/2019 | Dvortsov .............. G06F 3/0362 |
| 10,496,151 | B2 | 12/2019 | Kim et al. |
| 10,936,340 | B2 | 3/2021 | Lee et al. |
| 2009/0167770 | A1 | 7/2009 | Navale et al. |
| 2010/0079472 | A1 | 4/2010 | Shang et al. |
| 2014/0053260 | A1 | 2/2014 | Gupta et al. |
| 2017/0357465 | A1 * | 12/2017 | Dzeryn ................. G06F 3/0647 |
| 2018/0373373 | A1 | 12/2018 | Chae et al. |
| 2019/0087205 | A1 | 3/2019 | Guday |
| 2019/0230186 | A1 * | 7/2019 | Yellin ................. H04L 67/5681 |
| 2019/0237003 | A1 | 8/2019 | Cao et al. |
| 2019/0354384 | A1 * | 11/2019 | Huang ................ G06F 9/44521 |
| 2021/0064434 | A1 | 3/2021 | Park |
| 2022/0222082 | A1 * | 7/2022 | Gopalakrishnan .......................... G06F 9/44578 |

OTHER PUBLICATIONS

Office Action dated Jul. 19, 2023 in Indian Patent Application No. 202141010968 and English-language translation.
Hearing Notice dated Oct. 25, 2024 in Indian Patent Application No. 202141010968 and English-language translation.

* cited by examiner

METHOD AND ELECTRONIC DEVICE FOR BOOSTING GRAPHICS PERFORMANCE

CROSS-REFERENCE TO RELATED APPLICATIONS

This application is a continuation of International Application No. PCT/KR2022/003226 designating the United States, filed on Mar. 8, 2022, in the Korean Intellectual Property Receiving Office and claiming priority to Indian Provisional Application No. 202141010968, filed on Mar. 15, 2021, in the Indian Patent Office, and to Indian Complete Patent Application No. 202141010968, filed on Jan. 11, 2022, in the Indian Patent Office, the disclosures of all of which are incorporated by reference herein in their entireties.

BACKGROUND

Field

The disclosure relates to an electronic device, and for example, to a method and the electronic device for boosting graphics performance.

Description of Related Art

Users of electronic devices such as a smartphone, laptop, etc. are expecting a best experience from the electronic devices in terms of executing an application installed in the electronic devices and receiving a response from the application. Generally, when an input to launch the application is received, the electronic devices execute the application by loading the application, and displaying a main screen of the application. An amount of time (e.g. 2-5 seconds) is required to execute the application and display the main screen of the application. The time required to execute and display the main screen of a complicated and high-graphics application such as a gaming application, is even more, such as 10-15 seconds. As a result, the user must wait a long time to access the main screen of such an application, which may annoy the user. The problem will worsen if the computational, memory, and network resources of the electronic devices are constrained, resulting in frame drops and poor graphics performance of the electronic devices, which degrades a user experience. Thus, it is expected that at least a viable option for improving the graphics performance of the electrical devices would be provided.

SUMMARY

Embodiments of the disclosure provide a method and an electronic device for boosting graphics performance. The electronic device according to various example embodiments predicts that a user will be launching another application or another page of an application currently using by a user, which required a large time to launch or load. Further, the electronic device pre-emptively executes activity lifecycle states of the application and facilitates rendering on a virtual display to realize an instant application launch of the predicted application or the predicted page of the app.

Embodiments of the disclosure may utilize the virtual display to boost the graphics performance of the electronic device with display capabilities, and benefits to low computational devices.

Embodiments of the disclosure may encompass all preloading techniques along with the activity lifecycle states of the application that are rendered on the virtual display without a user's intervention or knowledge. The electronic device proactively controls various components to prevent and/or reduce user interruptions associated with the application displayed on the virtual display. Thus, the user can focus on an activity current doing on the electronic device, and the application will become ready in its final state before being shown to the user.

Embodiments of the disclosure may substantially instantly load the application without a waiting time by immediately moving the application displayed on the virtual display to a main/primary display (e.g., physical display) of the electronic device for improving the user experience, multitasking experience, and a smooth scrolling experience.

Accordingly, various example embodiments herein provide a method for boosting graphics performance of an electronic device. The method includes: determining, by a virtual display controller, a context of the electronic device for boosting the graphics performance; determining, by the virtual display controller, a current state of the electronic device; determining, by the virtual display controller, a graphics configuration of hardware components of the electronic device and an application of the electronic device based on the context of the electronic device and the current state of the electronic device; and creating, by the virtual display controller, a virtual display for displaying the application based on the graphics configuration of the hardware components and the application.

In an example embodiment, the method includes: detecting, by the virtual display controller, an input to launch the application displayed in the virtual display; moving, by the virtual display controller, the application from the virtual display to a main/primary display of the electronic device; applying, by the virtual display controller, a current graphics configuration change to the application; enabling, by the virtual display controller, the application for generating a user interruption by controlling the hardware components; and enabling, by the virtual display controller, the application for receiving user inputs.

In an example embodiment, the virtual display controller moves the application from the virtual display to a main display by switching between applications displayed in the main display and the virtual display, retaining states of the applications, and storing an instance state of each application on the virtual display.

In an example embodiment, detecting, by the virtual display controller the input to launch the application displayed in the virtual display, comprises: detecting, by the virtual display controller, scrolling through a list of an application displayed in the main display, and rendering, by the virtual display controller, subsequent components of the list on the virtual display.

In an example embodiment, the determining, by the virtual display controller, the context of the electronic device for boosting the graphics performance, comprises: monitoring, by the virtual display controller, interaction of a user with the electronic device over a time period, and predicting, by the virtual display controller, the context of the electronic device comprising an instant application launch being performed in future using the application by the electronic device based on the monitored user interaction.

In an example embodiment, the current state of the electronic device indicates a real-time consumption of the hardware components comprising a communicator, a memory, and/or a power source.

In an example embodiment, determining, by the virtual display controller, the graphics configuration of the hardware components of the electronic device and the application of the electronic device based on the context of the electronic device and the current state of the electronic device, comprises: determining, by the virtual display controller, whether the hardware components are available for displaying the application on the virtual display based on the on the context of the electronic device and the current state of the electronic device, disabling, by the virtual display controller, the application from generating the user interruption by controlling the hardware components, in response to determining that the hardware components are available for displaying the application on the virtual display, disabling, by the virtual display controller, the application from receiving user inputs, determining, by the virtual display controller, a context of the application, wherein the context of the application comprises a type of an application, a size of the application, a continuous draw requirement of the application, determining, by the virtual display controller, a surface requirement for rendering application on the virtual display, and a final state at run-time of the application for preventing redrawing of application based on the available hardware components of the electronic device, the context of the electronic device and the context of the application, and generating, by the virtual display controller, graphics configuration of the hardware components and application of the electronic device by managing activity lifecycle states of the application on the virtual display for an instant application launch based on the surface requirement and the run-time state of the application.

In an example embodiment, generating, by the virtual display controller, the virtual display for displaying the application based on the graphics configuration of the hardware components and the application, comprises: generating, by the virtual display controller, the virtual display, and displaying, by the virtual display controller, the application on the virtual display by applying the graphics configuration of the hardware components corresponding to the application.

In an example embodiment, applying the graphics configuration of the hardware components corresponding to the application, comprises: fetching, by the virtual display controller, a content of the application from a memory of the electronic device based on the graphics configuration of the application, generating, by the virtual display controller, a User Interface (UI) hierarchy using the content, rendering, by the virtual display controller, the application based on the UI hierarchy and the graphics configuration of the hardware components corresponding to the application, and rasterizing, by the virtual display controller, the rendered application on the virtual display.

Accordingly, various example embodiments herein provide an electronic device for boosting the graphics performance. The electronic device includes: a virtual display controller, a memory, and a processor, wherein the virtual display controller is coupled to the memory and the processor. The virtual display controller is configured to: determine the context of the electronic device for boosting the graphics performance; determine the current state of the electronic device; determine the graphics configuration of hardware components of the electronic device and the application of the electronic device based on the context of the electronic device and the current state of the electronic device; and generate the virtual display for displaying the application based on the graphics configuration of the hardware components and the application.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

This method and apparatus are illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

Figure 1:
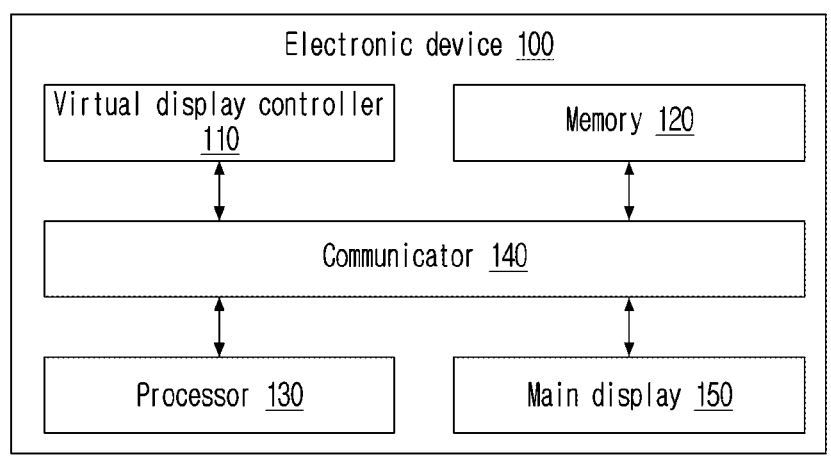
FIG. 1 is a block diagram illustrating an example configuration of an electronic device for boosting graphics performance, according to various embodiments.

The various example embodiments herein and the various features and advantageous details thereof are explained in greater detail with reference to the non-limiting embodiments that are illustrated in the accompanying drawings and detailed in the following description. Descriptions of well-known components and processing techniques may be omitted to not unnecessarily obscure the embodiments herein. The various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to aid in understanding various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally simply used to distinguish one element from another.

Accordingly, the embodiments herein provide a method for boosting graphics performance of an electronic device. The method includes: determining, by the electronic device, a context of the electronic device and a user of the electronic device for boosting the graphics performance; determining, by the electronic device, a current state of the electronic device; determining, by the electronic device, a graphics configuration of hardware components of the electronic device and an application of the electronic device based on the context of the electronic device and the user, and the current state of the electronic device; and creating, by the electronic device, a virtual display for displaying the application based on the graphics configuration of the hardware components and the application.

Accordingly, the example embodiments herein provide an electronic device for boosting the graphics performance. The electronic device includes: a virtual display controller, a memory, and a processor, wherein the virtual display controller is coupled to the memory and the processor. The virtual display controller is configured to: determine the context of the electronic device and the user of the electronic device for boosting the graphics performance; determine the current state of the electronic device; determine the graphics configuration of hardware components of the electronic device and the application of the electronic device based on the context of the electronic device and the user, and the current state of the electronic device; and create the virtual display for displaying the application based on the graphics configuration of the hardware components and the application.

Unlike existing methods and systems, the electronic device predicts that the user will be launching another application or another page of an application that is currently using by the user which required a large time to launch or load. Further, the electronic device pre-emptively executes activity lifecycle states of the application and facilitates rendering on the virtual display to realize an instant application launch of the predicted application or the predicted page of the app.

Preloading is a method that primarily involves formation of objects by loading required contents from a permanent storage to a random-access memory. Existing preloading performance boosting techniques involve preparing a zygote for the application, allocating a reserved memory for application components, and loading static classes that the application will use. Unlike the existing reloading technique, the method of the disclosure allows the electronic device to prepare a UI hierarchy along with loading of the required contents from the permanent storage. Further, the electronic device renders and rasterizes the application on the virtual display based on the UI hierarchy. The application encompasses the preloading techniques along with the activity lifecycle states that are rendered on the virtual display without a user's intervention or knowledge. So that the application is ready in its final state before being shown to the user. Also, the electronic device proactively controls various components to prevent and/or reduce user interruptions associated with the application displayed on the virtual display. Thus, the user can focus on current activity doing on the electronic device.

Unlike existing methods and systems, the method of the disclosure utilizes the virtual displays to boost the graphics performance of the electronic device with display capabilities, and benefits to low computational devices.

Referring now to the drawings, and more particularly to FIGS. 1 through 12, there are illustrated and described various example embodiments.

FIG. 1 is a block diagram illustrating an example configuration of an electronic device (100) for boosting graphics performance, according to various embodiments. Examples of the electronic device (100) include, but are not limited to a smartphone, a tablet computer, a Personal Digital Assistance (PDA), a desktop computer, an Internet of Things (IoT), a wearable device, etc. In an embodiment, the electronic device (100) includes a virtual display controller (110), a memory (120), a processor (e.g., including processing circuitry) (130), a communicator (e.g., including communication circuitry) (140), and a main/primary display (150), where the main display is a physical hardware component that can be used to display to a user. Examples of the main display include, but are not limited to a light emitting diode display, a liquid crystal display, a projector, etc. The virtual display controller (110) may be implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The virtual display controller (110) determines a context of the electronic device (100) for boosting the graphics performance. The context of the electronic device (100) comprising an instant application launch of an application installed in the electronic device (100) being performed in future. In an embodiment, the virtual display controller (110) monitors an interaction of the user with the electronic device (100) over a time period. An example of the interactions can be a usage of each application installed in the electronic device (100). Further, the virtual display controller (110) predicts the context of the electronic device (100) and the user based on the monitored user interaction.

The virtual display controller (110) determines a current state of the electronic device (100). The current state of the electronic device (100) indicates a real-time consumption of hardware components of the electronic device (100) such as, but not limited to the communicator (140), the memory (120), and the main display (150), a power source (e.g. battery).

The virtual display controller (110) determines the graphics configuration of the hardware components and the application based on the context of the electronic device (100) and the current state of the electronic device (100). In an embodiment, the virtual display controller (110) determines whether the hardware components are available for virtually displaying the application based on the context of the electronic device (100) and the current state of the electronic device (100). Further, the virtual display controller (110) disables the application from creating/generating a user interruption by controlling the hardware components, in response to determining that the hardware components are available for virtually displaying the application. Examples of the user interruption include, but are not limited to an audio interruption, a vibration, a visual interruption, a microphone interruption, a camera interruption, a notification, a recent menu, etc. Further, the virtual display controller (110) disables the application from receiving user inputs. Examples of the user inputs include, but are not limited to a touch input, a gaze input, an audio input, etc. Further, the virtual display controller (110) determines a context of the application, where the context of the application comprises a type of an application, a size of the application, and a continuous draw requirement of the application. Further, the virtual display controller (110) determining a surface requirement for rendering application, and a final state at run-time of the application for preventing redrawing or excessive drawing of application based on the available hardware components of the electronic device (100), the context of the electronic device (100) and the context of the application. The final state at run-time of the application may a hold state (e.g., a memory efficient state) and a ready state (e.g., performance boost state) based on a current device and app parameters like memory availability, network requirement, app size, etc. Further, the virtual display controller (110) generates the graphics configuration of the hardware components and application of the electronic device (100) by managing activity lifecycle states of the application for an instant application launch based on the surface requirement and the run-time state of the application. In an operating system of the electronic device (100), every page that the user sees (e.g., the activity done on the application) goes through some steps called as the activity lifecycles to prepare a UI, before the page is shown to the user.

The virtual display controller (110) creates/generates a virtual display (117) for displaying the application based on the graphics configuration of the hardware components and the application. The virtual display (117, refer to FIG. 2) is an application-based representation of the physical display (150) on which the application/middleware can render graphics components of the application/middleware. The electronic device (100) uses the virtual display (117) to prepare graphics components in advance without noticing/interrupting the user while the user is using the electronic device (100).

In an embodiment, the virtual display controller (110) displays the application on the virtual display (117) by applying the graphics configuration of the hardware components corresponding to the application upon creating the virtual display (117). In an embodiment, the virtual display controller (110) fetches a content of the application such as graphics components of the application from a memory (120) of the electronic device (100) based on the graphics configuration of the application. Further, the virtual display controller (110) creates a User Interface (UI) hierarchy using the content. Further, the virtual display controller (110) renders the application based on the UI hierarchy and the graphics configuration of the hardware components corresponding to the application. Further, the virtual display controller (110) rasterizes the rendered application on the virtual display (117).

The virtual display controller (110) detects an input from the user to launch the application displayed in the virtual display (117). In an embodiment, the virtual display controller (110) detects scrolling through a list of an application displayed in the main display (150). An example for the list of the application can be a scrollable list in a native application. Further, the virtual display controller (110) renders subsequent components of the list on the virtual display (117). An example for the list of the application can be a scrollable feed of a native social media application loaded in the application that is displayed in the main display (150), whereas the subsequent components of the list can be a subsequent scrollable feed in the native application of the scrollable list in the native application displayed in the main display (150).

The virtual display controller (110) moves the application from the virtual display (117) to the main display (150) of the electronic device (100) upon receiving the input to launch the application displayed in the virtual display (117). In an embodiment, the virtual display controller (110) switches between applications displayed in the main display (150) and the virtual display (117). Further, the virtual display controller (110) saves/stores an instance state of both the applications on the virtual display (117). The instance state refers to a status of the UI hierarchy of the application, where the virtual display controller (110) retains the UI hierarchy and hence don't require to redraw the UI again. The virtual display controller (110) applies a current graphics configuration change to the application while moving the displayed application from the virtual display (117) to the main display (150). Further, the virtual display controller (110) enables the application that is moved to the main display (150) for creating the user interruption by controlling the hardware components. Further, the virtual display controller (110) enables the application that is moved to the main display (150) for receiving the user inputs.

The memory (120) stores the content of the application. The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the electronic device (100), a cloud storage, or any other type of external storage.

The processor (130) may include various processing circuitry and is configured to execute instructions stored in the memory (120). The processor (130) may include a general-purpose processor, such as, for example, and without limitation, a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) may include various communication circuitry and is configured for communicating internally between hardware components in the electronic device (100). Further, the communicator (140) is configured to facilitate the communication between the electronic device (100) and other devices via one or more networks (e.g. Radio technology). The communicator (140) may include an electronic circuit specific to a standard that enables wired or wireless communication.

In an embodiment, the virtual display controller (110) identifies an application likely to be launched/accessed on the primary display (150) at a given time instant. Further, the virtual display controller (110) pre-processes a launch of the application on the virtual display (117). Further, the virtual display controller (110) switches the application for access by user, from the virtual display (117) to the primary display (150) upon receiving a user input for the application launch.

In an embodiment, the virtual display controller (110) monitors a plurality of applications launched and/or accessed on the primary display (150) by the user over a time using a neural network. Further, the virtual display controller (110) identifies a first application currently being accessed via the primary display (150). Further, the virtual display controller (110) predicts using the neural network a second application that is likely to be launched and/or accessed by the user subsequent to the first application. Further, the virtual display controller (110) executes in background the launch of the second application in a virtual display (117). Further, the virtual display controller (110) switches the access of the second application from the virtual display (117) onto the primary display (150), upon the user input to launch and/or access the second application. In an embodiment, the virtual display controller (110) detects an instant app launch use case, gets next probable application to launch by the user, inhibits interruptions, and manages the lifecycle states on the virtual display (117) to provide the instant app launch. In an embodiment, when the user wants to switch between the applications and retains the states of the applications, then the virtual display controller (110) saves the application the instance state on the virtual display (117) to ensure seamless multitasking and application switching. In an embodiment, when the user is scrolling through a long list, the virtual display controller (110) loads subsequent components of the list on the virtual display (117), and draws the subsequent components on the main display (150) on request to provide smooth scrolling without frame drops. In an embodiment, low computational devices (e.g. IoT devices) in a user environment can leverage computation power of a high computational device for graphical processing, by offloading requests to be handled on the virtual display (117) of the high computational device. In an embodiment, when the user wants to play videos in background while using other functionalities on the electronic device (100), the virtual display controller (110) plays the video on the virtual display (117) without an interruption to reduce power consumption.

In an embodiment, the virtual display controller (110) identifies a current user use case scenario for graphical performance enhancement. Further, the virtual display controller (110) checks an applicability of the use case based on a current device state. Further, the virtual display controller (110) handles the hardware, the audio, the input and a display focus, and prevents and/or reduces user interruptions. Further, the virtual display controller (110) creates a virtual display (117) and determines surface requirement for creating the virtual display (117). Further, the virtual display controller (110) renders graphical components on the virtual display (117) and identifies the application status based on the electronic device (100) and the user context. Further, the virtual display controller (110) handles movement of the application from the virtual display (117) to the main display (150) on user request, and ensures correct configuration and transition animations are applied.

Although the FIG. 1 illustrates example hardware components of the electronic device (100) it is to be understood that various other example embodiments are not limited thereon. In various embodiments, the electronic device (100) may include less or a greater number of components. Further, the labels or names of the components are used only for illustrative purpose and does not limit the scope of the disclosure. One or more components can be combined together to perform same or substantially similar function for boosting the graphics performance.

Figure 2:
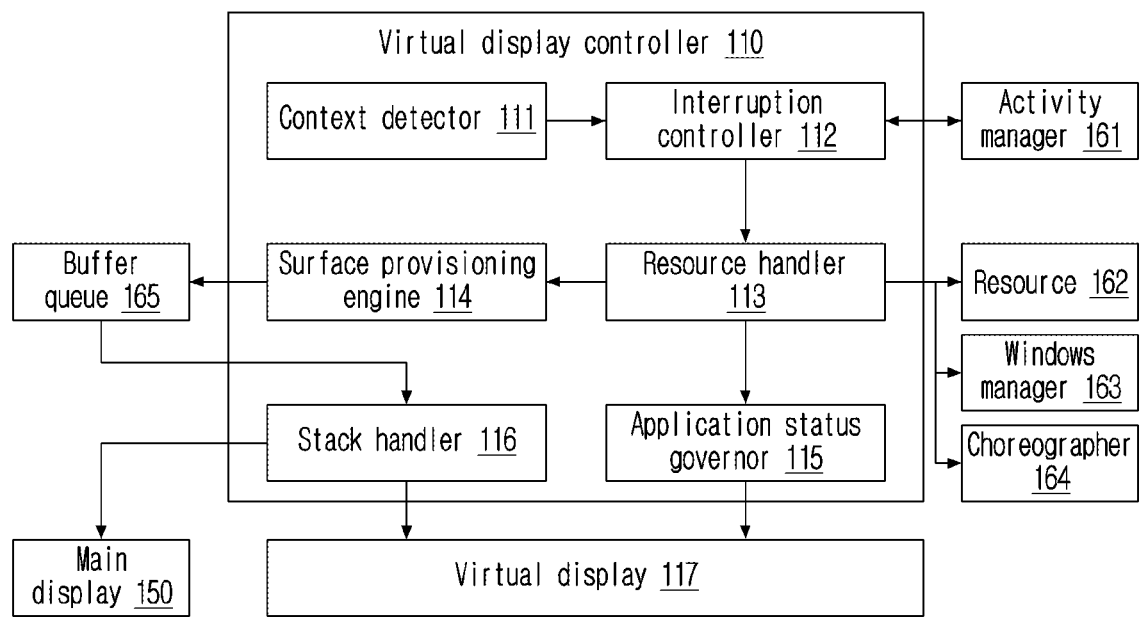
FIG. 2 is a block diagram illustrating an example configuration of a virtual display controller for creating a virtual display for displaying an application based on a graphics configuration of hardware components and the application, according to various embodiments.

FIG. 2 is a block diagram illustrating an example configuration of a virtual display controller (110) for creating the virtual display (117) for displaying the application based on the graphics configuration of the hardware components and the application, according to various embodiments. In an embodiment, the virtual display controller (110) includes a context detector (e.g., including various processing circuitry and/or executable program instructions) (111), an interruption controller (e.g., including various processing circuitry and/or executable program instructions) (112), a resource handler (e.g., including various processing circuitry and/or executable program instructions) (113), a surface provisioning engine (e.g., including various processing circuitry and/or executable program instructions) (114), an application status governor (e.g., including various processing circuitry and/or executable program instructions) (115), and a stack handler (e.g., including various processing circuitry and/or executable program instructions) (116). The context detector (111), the interruption controller (112), the resource handler (113), the surface provisioning engine (114), the application status governor (115), the stack handler (116), and the virtual display (117) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like. In an embodiment, the electronic device (100) additionally includes an activity manager (e.g., including various processing circuitry and/or executable program instructions) (161), a resource manager (e.g., including various processing circuitry and/or executable program instructions) (162), a windows manager (e.g., including various processing circuitry and/or executable program instructions) (163), a choreographer (e.g., including various processing circuitry and/or executable program instructions) (164), and a buffer queue (165). The activity manager (161) handles the layout and hierarchy of the UI seen by the user. The resource manager (162) handles rendering of images, text, buttons and other elements within the UI layout. The windows manager (163) handles transitions between windows and determines the aspects of the window shown to the user. The choreographer (164) communicates with the hardware to ensure rendering of UI components at periodic intervals. The buffer queue (165) communicates UI frames to be rendered by the hardware.

The context detector (111) determines the context of the electronic device (100) and the user. An example for the context of the electronic device (100) and the user can be a use-case performing by the user on the electronic device (100) such as launching a gaming application of the electronic device (100) due to a user input, transition between a payment application and an instant message application of the electronic device (100) due to the user input, scrolling by the user a scrollable list in an application of the electronic device (100).

The context detector (111) checks for pre-requisite conditions for the determined context. In an embodiment, the context detector (111) monitors the interaction of the user with the electronic device (100) over the time period. Further, the context detector (111) predicts the context of the electronic device (100) and the user based on the monitored user interaction. The context detector (111) determines the current state of the electronic device (100). The context detector (111) determines the context of the application. The context detector (111) is responsible for instant application launch, seamless multitasking, fluid scrolling, and efficient video playback.

The resource handler (113) instructs the resource manager (162) for allocating the resources (e.g., hardware components) for drawing the content of the application. The resource handler (113) determines the graphics configuration of the hardware components and the application based on the context of the electronic device (100) and the user, and the current state of the electronic device (100). In an embodiment, the resource handler (113) determines whether the hardware components are available for virtually displaying the application based on the context of the electronic device (100) and the user, and the current state of the electronic device (100).

The interruption controller (112) disables the application from creating the user interruption by controlling the hardware components, in response to determining that the hardware components are available for virtually displaying the application. Further, the interruption controller (112) disables the application from receiving the user inputs and focusing the user inputs on the application displayed in the main display (150). The interruption controller (112) handles revoke and grant of application permissions. The interruption controller (112) stops input focus shift to the virtual display (117). The interruption controller (112) revokes intrusive background permission of the application.

The interruption controller (112) ensures to not trigger events associated with the hardware components of the application that to be displayed in the virtual display (117), where the examples of the hardware components include, but are not limited to a camera, a speaker, a flashlight, a vibrator, a sensor, buttons, external keyboard, etc. The interruption controller (112) manages user-application interactions for explicitly controlling certain use-case scenarios to avoid interruption. The examples of the user-application interactions include, but are not limited to a uninstall, reboot, edge application handling, virtual assistant handling, 3rd party application lock, navigation bar changes, multi-user application profiles, etc. When the application is displayed on the virtual display (117), the interruption controller (112) manages configuration changes to not cause any problem in transition from the virtual display (117) to the main display (150). The examples of the user-application interactions include, but are not limited to a theme, orientation, locale, font, resolution, refresh rate, window size, etc. The interruption controller (112) manages application-hardware integrated features such as fingerprint, face unlock, network (e.g. Wi-Fi, Bluetooth), gestures, location, permission changes, etc., and regulates policies to avoid consumption by events on the virtual display (117).

The interruption controller (112) avoids creation of the virtual display (117) when the electronic device (100) operates in modes such as desktop mode, flight mode, easy mode, power saving mode, focus mode, do-not-disturb mode, etc. The interruption controller (112) customizes the creation of the virtual display (117), and the transition of the application from the virtual display (117) to the main display (150) when the electronic device (100) handles a multiwindow, animations, a SmartView, a secondary display, an operating system auto, a link to windows, and accessibility and visual hearing enhancements. The interruption controller (112) controls the developer and experimental options such as a don't keep activities option, a single-tap activation option, a freedom windows option, a force desktop mode, a performance tune option, and a modified animation, window, & transition scale option. The interruption controller (112) ensures that possibilities of defects arising due to these settings can't be ruled out and should be supported.

The surface provisioning engine (114) determines the surface requirement for rendering application on the virtual display (117) based on the available hardware components of the electronic device (100), the context of the electronic device (100) and the user, and the context of the application. In an embodiment, the surface provisioning engine (114) identifies first parameters include the use-case, an available memory, the type of the application, and an available battery level of the electronic device (100). Further, the surface provisioning engine (114) normalizes the first parameters into a range of 0 to 1. Further, the surface provisioning engine (114) determines whether to render the application on the virtual display (117) with or without a surface by applying the normalized first parameters to a binary classification model or a logistic regression model.

The application status governor (115) determines the final state at run-time of the application for preventing redrawing of application based on the available hardware components of the electronic device (100), and the context of the application. In an embodiment, the application status governor (115) identifies second parameters include a network accessibility, the available memory, the size of the application, and a continuous draw of the electronic device (100). Further, the application status governor (115) normalizes the second parameters into a range of 0 to 1. Further, the application status governor (115) determines whether to keep the rendered application on the hold state or the ready state by applying the normalized second parameters to a clustering model or a heuristic model. The application status governor (115) invokes after graphics handling and ascertains a state of the application to the hold state or the ready state. In hold state, the application status governor (115) compresses the application and store the application in compressed form for better memory utilization. In ready state, the application status governor (115) keeps the application in a latest state for best performance gains. The application status governor (115) updates the state of the application and the final state at run-time of the application based on changes in the system parameters. The application status governor (115) ascertains application state/status after rendering for preventing the excessive drawings or redrawing of the application and hence to conserve the memory (120) and electric power.

The stack handler (116) moves the application from the virtual display (117) to the main display (150) of the electronic device (100) and ensures that the correct graphics configuration and smooth transition animations are applied upon receiving the input to launch the application displayed in the virtual display (117). In an embodiment, the stack handler (116) switches between applications displayed in the main display (150) and the virtual display (117). Further, the stack handler (116) retains the states of both the applications. Further, the stack handler (116) saves the instance state of both the applications on the virtual display (117). The stack handler (116) applies the current graphics configuration change to the application while moving the displayed application from the virtual display (117) to the main display (150). Further, the interruption controller (112) enables the application that is moved to the main display (150) for creating the user interruption by controlling the hardware components. Further, the interruption controller (112) enables the application that is moved to the main display (150) for receiving the user inputs.

The stack handler (116) determines the display (150, 117) on which the drawing of the application should occur. The stack handler (116) handles switching of stacks between the displays (150, 117) for moving the application. The stack handler (116) ensures correct configuration between displays (150, 117) while moving the application. The stack handler (116) handles animations and transitions of the application while moving the application from the virtual display (117) to the main display (150).

Although the FIG. 2 illustrates various hardware components of the virtual display controller (110) it is to be understood that various embodiments are not limited thereto. In various embodiments, the virtual display controller (110) may include less or a greater number of components. Further, the labels or names of the components are used only for illustrative purpose and does not limit the scope of the disclosure. One or more components can be combined together to perform same or substantially similar function for creating the virtual display (117) for displaying the application based on the graphics configuration of the hardware components and the application.

Figure 3:
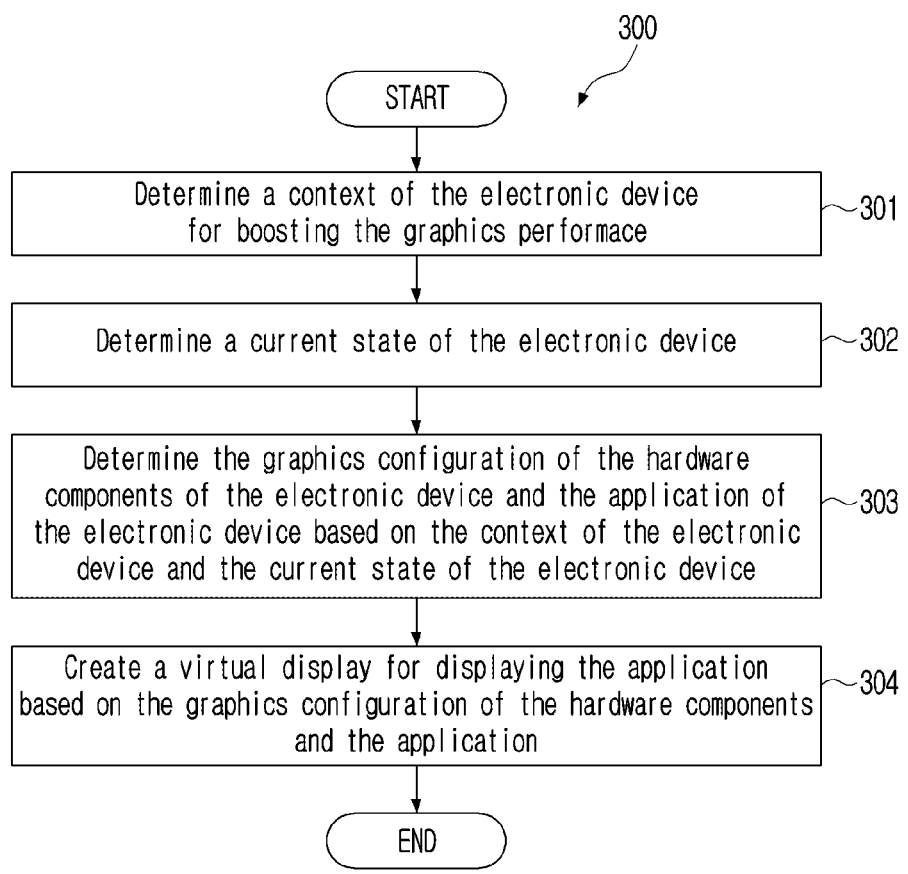
FIG. 3 is a flowchart illustrating an example method for boosting the graphics performance of the electronic device, according to various embodiments.

FIG. 3 is a flowchart (300) illustrating an example method for boosting the graphics performance of the electronic device (100), according to various embodiments. In an embodiment, the method allows the virtual display controller (110) to perform operations 301-304 of the flow diagram (300). At operation 301, the method includes determining the context of the electronic device (100) for boosting the graphics performance. At operation 302, the method includes determining the current state of the electronic device (100). At operation 303, the method includes determining the graphics configuration of the hardware components of the electronic device (100) and the application of the electronic device (100) based on the context of the electronic device (100) and the current state of the electronic device (100). At operation 304, the method includes creating the virtual display (117) for displaying the application based on the graphics configuration of the hardware components and the application.

Figure 4:
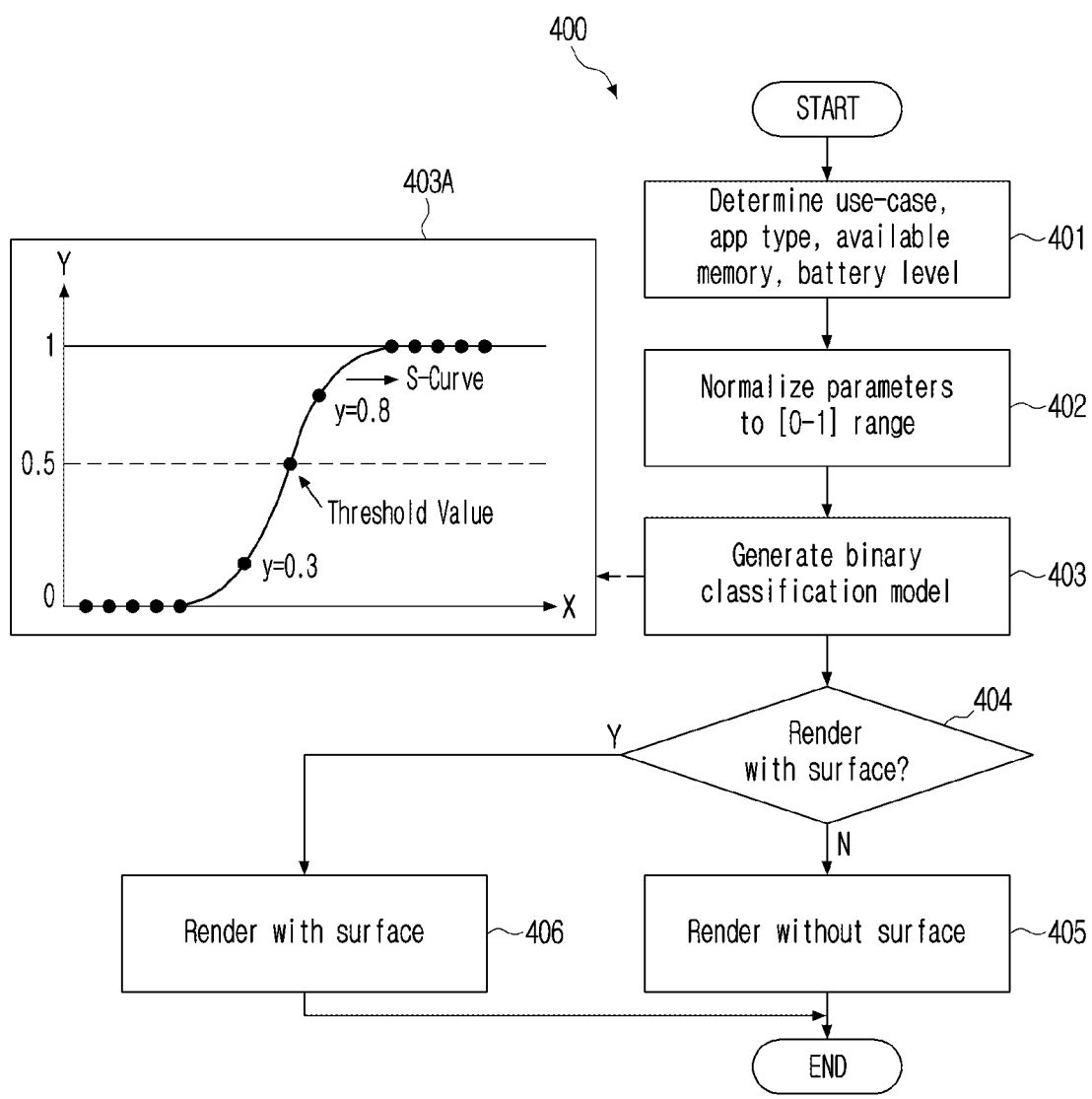
FIG. 4 is a flowchart illustrating an example method for determining a surface requirement for rendering the application on the virtual display, according to various embodiments.

FIG. 4 is a flowchart (400) illustrating an example method for determining the surface requirement for rendering the application on the virtual display (117), according to various embodiments. In an embodiment, the method allows the surface provisioning engine (114) to perform operations 401-406 of the flow diagram (400). At 401, the method includes determining the first parameters include, for example, the use-case, the application type, the available memory, the battery level of the electronic device (100). At 402, the method includes normalizing the first parameters into a range of 0 to 1. At 403, the method includes generating a binary classification model (403A) using the normalized first parameters. At 404, the method includes determining whether to render the application on the virtual display (117) with or without the surface based on the binary classification model (403A). At 405, the method includes rendering the application on the virtual display (117) without the surface, upon determining to render without the surface. At 406, the method includes rendering the application on the virtual display (117) with the surface, and drawing the graphics components of the application on the surface, upon determining to render with the surface.

Figure 5:
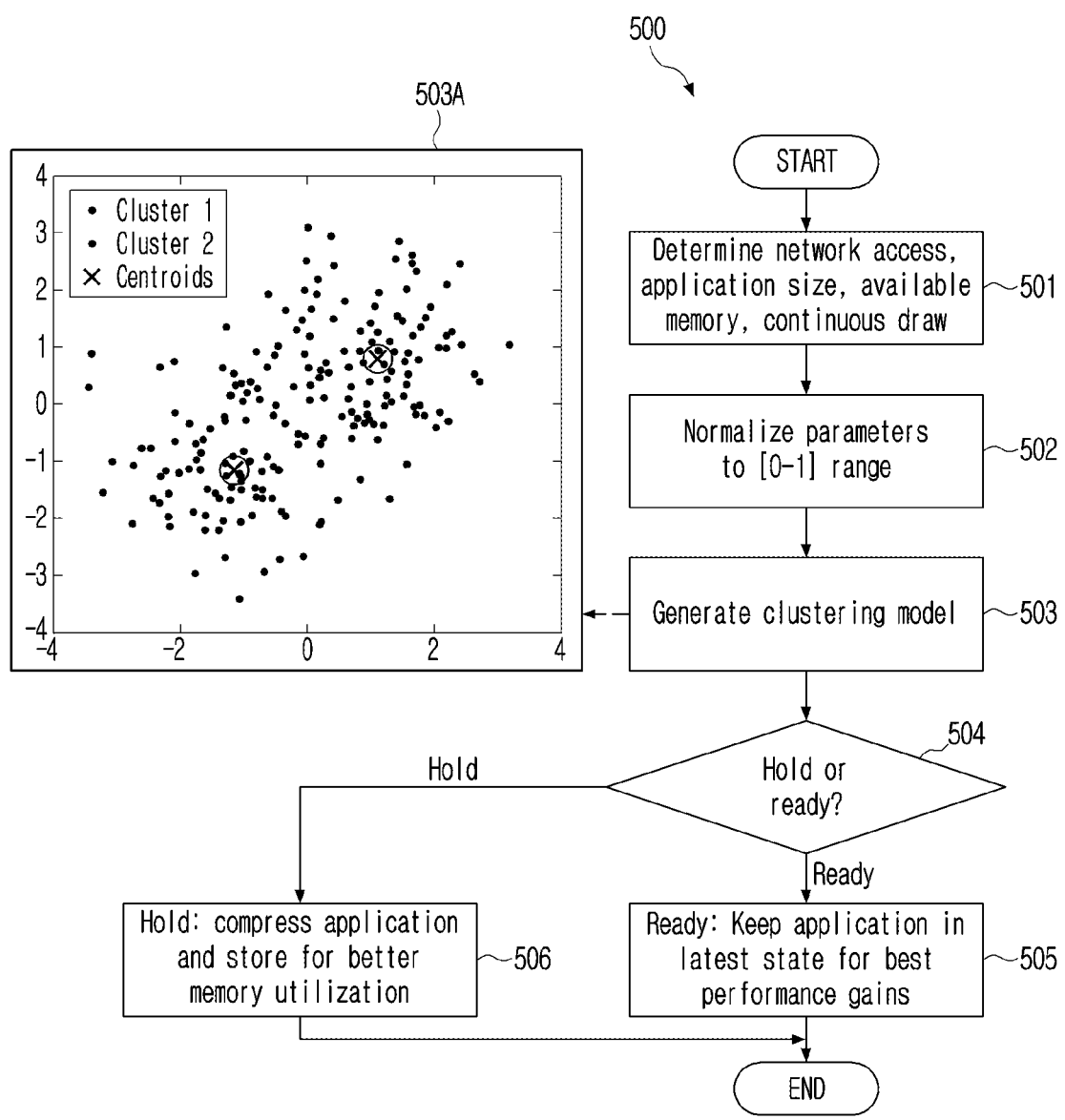
FIG. 5 is a flowchart illustrating an example method for determining a final state at run-time of the application, according to various embodiments.

FIG. 5 is a flowchart (500) illustrating an example method for determining the final state at run-time of the application, according to various embodiments. In an embodiment, the method allows the application status governor (115) to perform operations 501-506 of the flowchart (400). At 501, the method includes determining the second parameters including, for example, the network access, the application size, the available memory, the continuous draw of the electronic device (100). At 502, the method includes normalizing the second parameters into the range of 0 to 1. At 503, the method includes generating a clustering model (503A) using the normalized second parameters. At 504, the method includes determining whether to keep the rendered application on the hold state or the ready state based on the clustering model (503A). At 505, the method includes keeping the rendered application on the hold state to compress the application and store for better memory utilization, upon determining to keep on hold state. At 506, the method includes keeping the rendered application on the ready state to keep the application in the latest state for best performance gains, upon determining to keep on the ready state.

The various actions, acts, blocks, steps, or the like in the flowcharts (300, 400, and 500) may be performed in the order presented, in a different order, or simultaneously. Further, in various embodiments, some of the actions, acts, blocks, steps, or the like may be omitted, added, modified, skipped, or the like without departing from the scope of the disclosure.

Figure 6A:
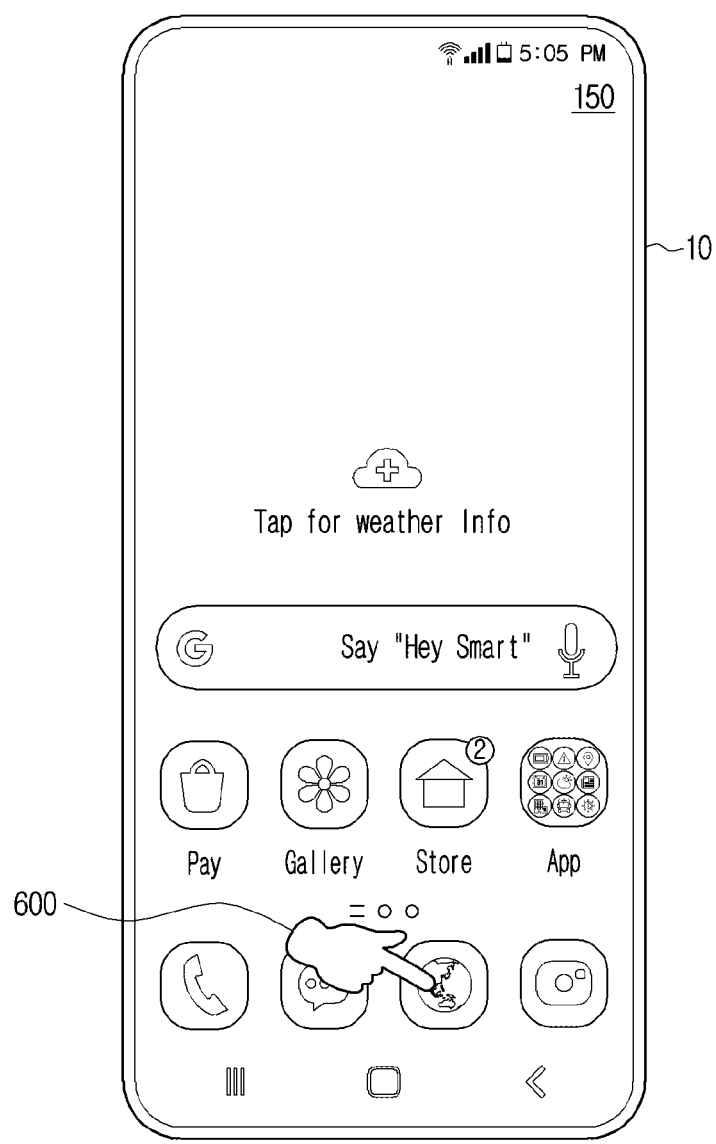
FIGS. 6A, 6B, 6C, 6D, 7A, 7B, 7C, 7D, 7E and 7F are diagrams illustrating an example scenario of launching a gaming application in an existing electronic device and the proposed electronic device, according to various embodiments.
Figure 6B:
Figure 6C:
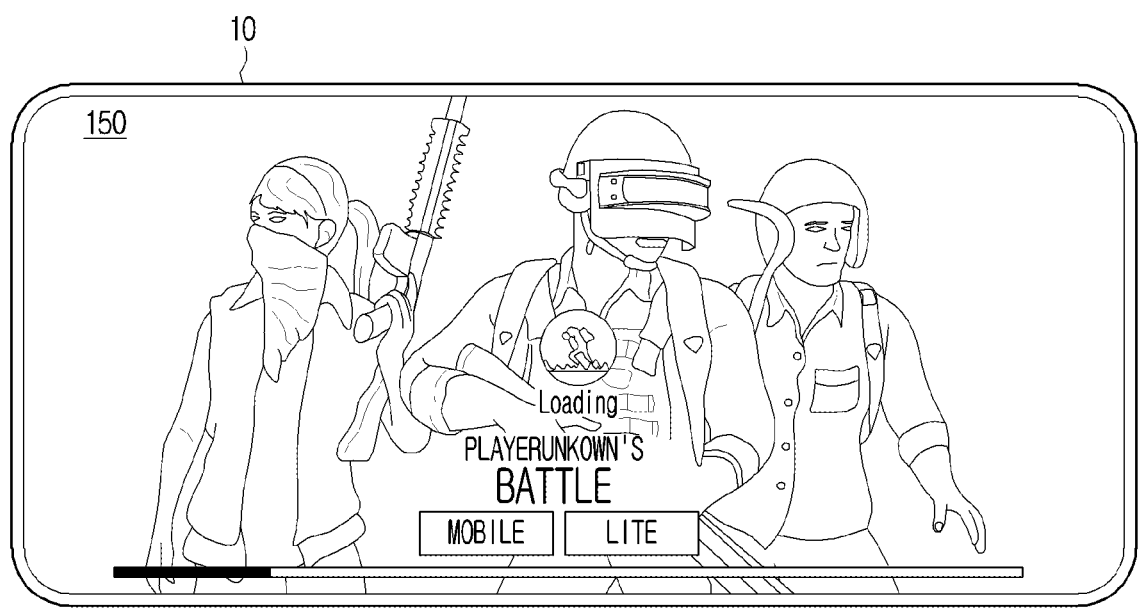
Figure 6D:
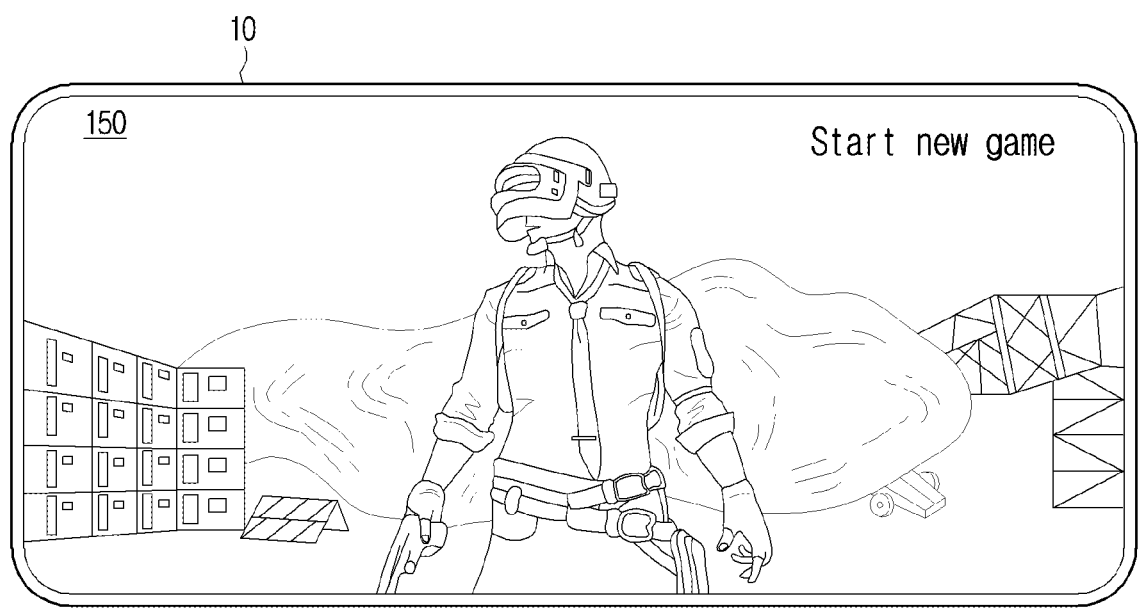

FIGS. 6A, 6B, 6C, 6D, 7A, 7B, 7C, 7D, 7E and 7F (which may be referred to herein as "FIGS. 6A to 7F") are diagrams illustrating an example scenario of launching a gaming application in an existing electronic device (10) and the proposed electronic device (100), according to various embodiments. Launching of the gaming application in the existing electronic device (10) is shown in the FIGS. 6A, 6B, 6C and 6D. A conventional smartphone includes the main display (150) is an example of the existing electronic device (10). In FIG. 6A, it is considered that a user (600) taps on an icon of the gaming application displayed on the main display (150) of the existing electronic device (10) to launch the gaming application. In FIGS. 6B and 6C, upon receiving the input to launch the gaming application, the existing electronic device (10) launches the gaming application, and sequentially renders graphics components of the gaming application on the main display (150). In FIG. 6D, upon sequentially loading the graphics components of the gaming application, the existing electronic device (10) displays a start game screen of the gaming application on the main display (150). In the existing electronic device (10), an amount of time (e.g. 15 seconds) is required to reach the start game screen after receiving the input to launch the gaming application. The user (600) needs to wait till that much time to start/play a game using the gaming application, which degrades a user experience.

Figure 7A:
Figure 7B:
Figure 7C:
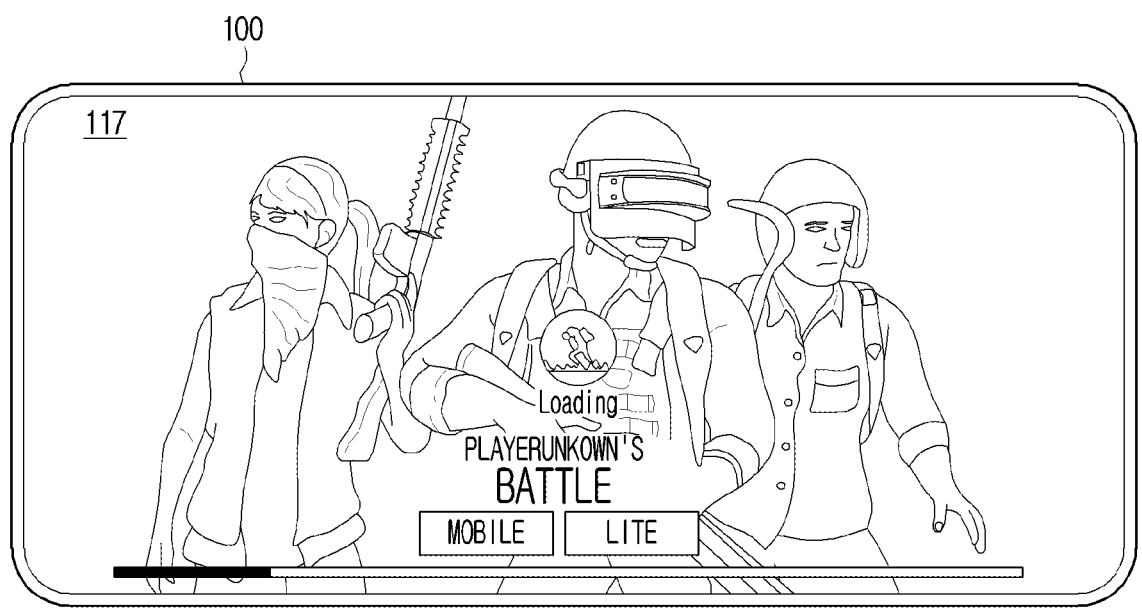
Figure 7D:
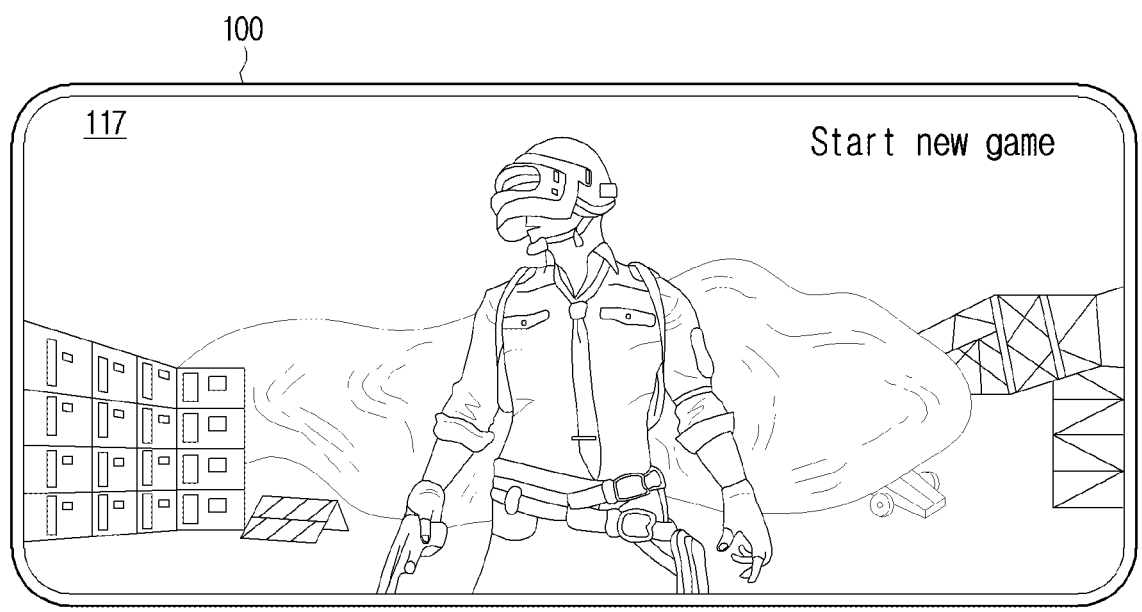

The launching of the gaming application in the proposed electronic device (100) is shown in the FIGS. 7A, 7B, 7C, 7D, 7E and 7F. In FIG. 7A, the electronic device (100) predicts that the instant application launch being performed in the future on the gaming application based on the interaction of the user (600) with the proposed electronic device (100) monitored over the time period. The proposed electronic device (100) prevents and/or reduces the gaming application from getting device input focus, disables the sound, vibration, notification, and permissions of the gaming application if the gaming application would disturb current user experience, and avoids device orientation changes required for the gaming application. In FIGS. 7B, 7C and 7D, the proposed electronic device (100) launches the gaming application in background without interrupting the user interaction, and sequentially renders the graphics components of the gaming application on the virtual display (117) based on the prediction. The proposed electronic device (100) prevents and/or reduces display focus shift to the virtual display (117).

Figure 7E:
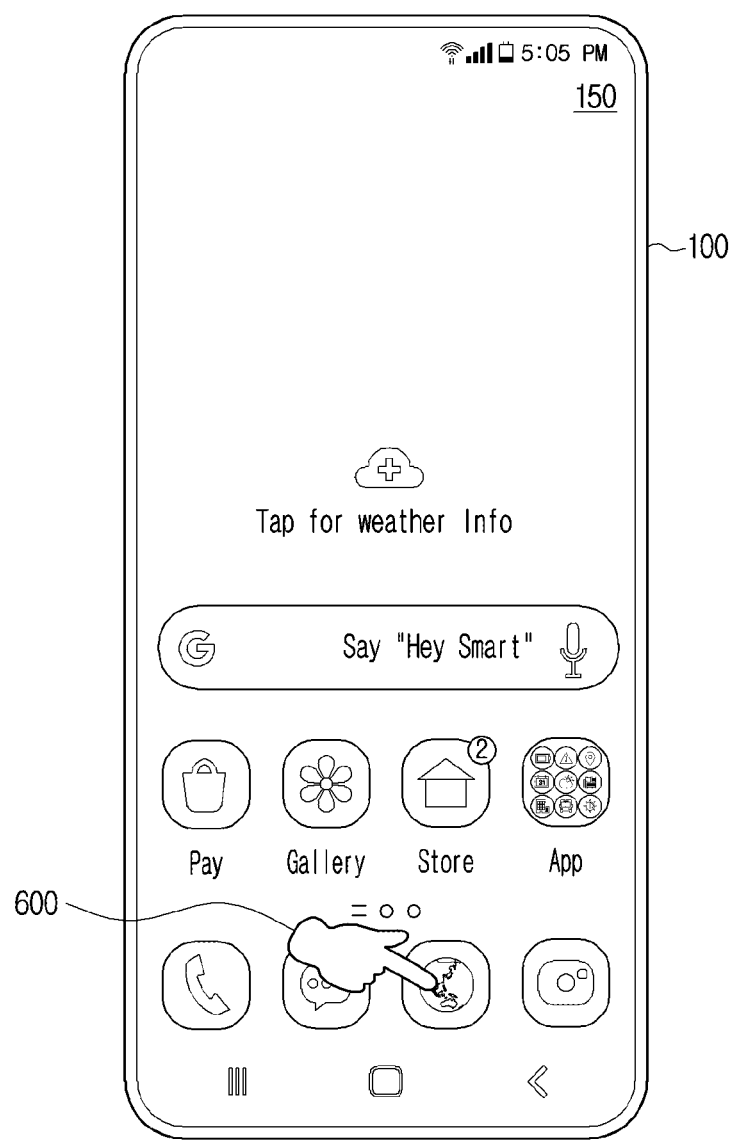
Figure 7F:
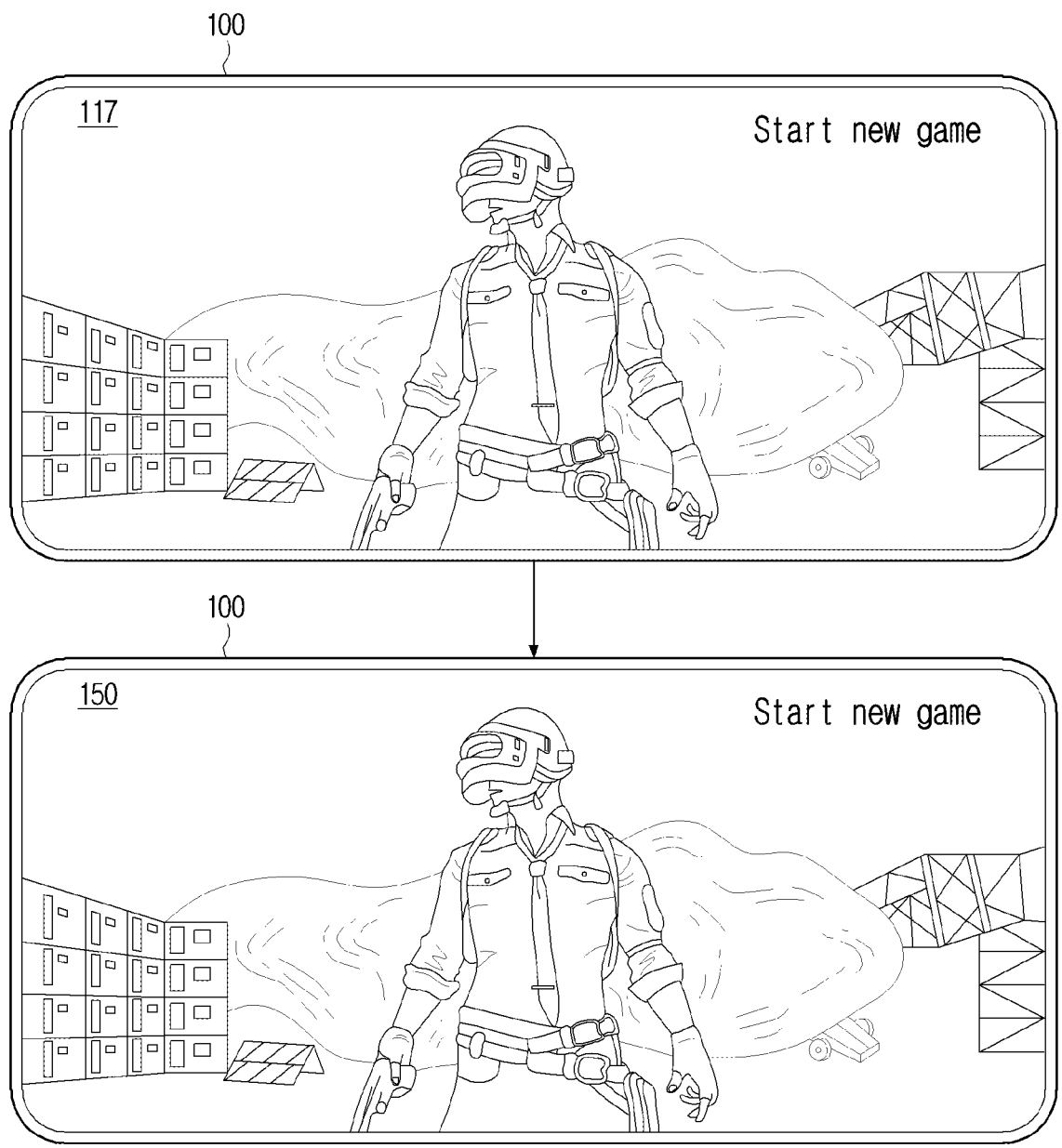

Further, the proposed electronic device (100) handles all execution of the gaming application, displays the start game screen of the gaming application on the virtual display (117), and prevent further drawing on the virtual display (117). Further, the proposed electronic device (100) hides recent menu entry of the gaming application. In FIG. 7E, it is considered that the user (600) taps on the icon of the gaming application displayed on the main display (150) of the proposed electronic device (100) to launch the gaming application. In FIG. 7F, upon receiving the input to launch the gaming application, the proposed electronic device (100) moves the start game screen of the gaming application displayed on the virtual display (117) to the main display (150), provides correct animations and latest configurations without creating any delay to the user (600), and enables the permissions, the sound, the vibration, and the notification of the gaming application. Thus the method enhances the graphics performance of the proposed electronic device (100). Moreover, the user (600) can substantially instantly start/play the game without a waiting time after inputting to launch the gaming application, which improves the user experience.

Figure 8A:
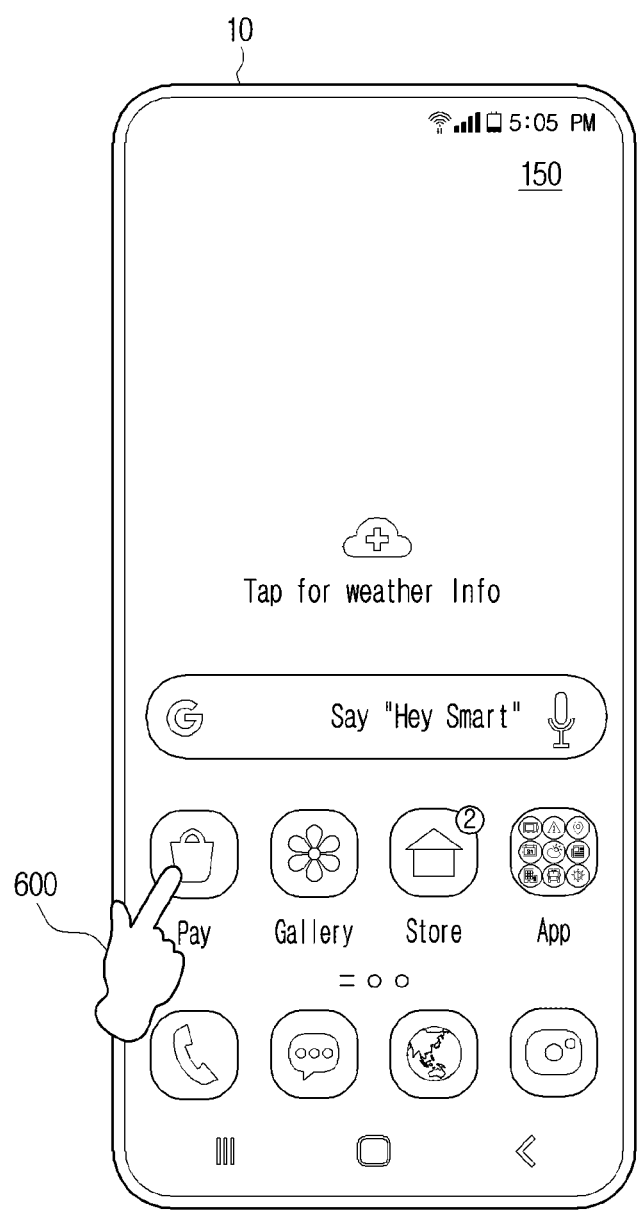
FIGS. 8A, 8B, 8C, 8D, 8E, 8F, 8G, 9A, 9B, 9C, 9D, 9E, 9F, 9G and 9H are diagrams illustrating an example scenario of transition between a payment application and an instant message application in the existing electronic device and the proposed electronic device, according to various embodiments.
Figure 8B:
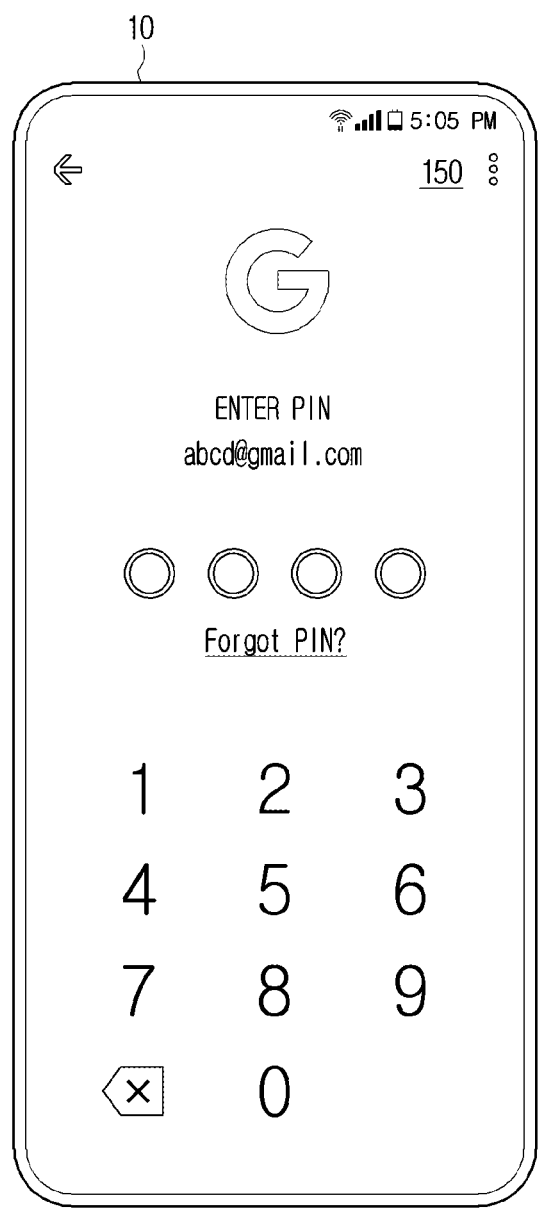
Figure 8C:
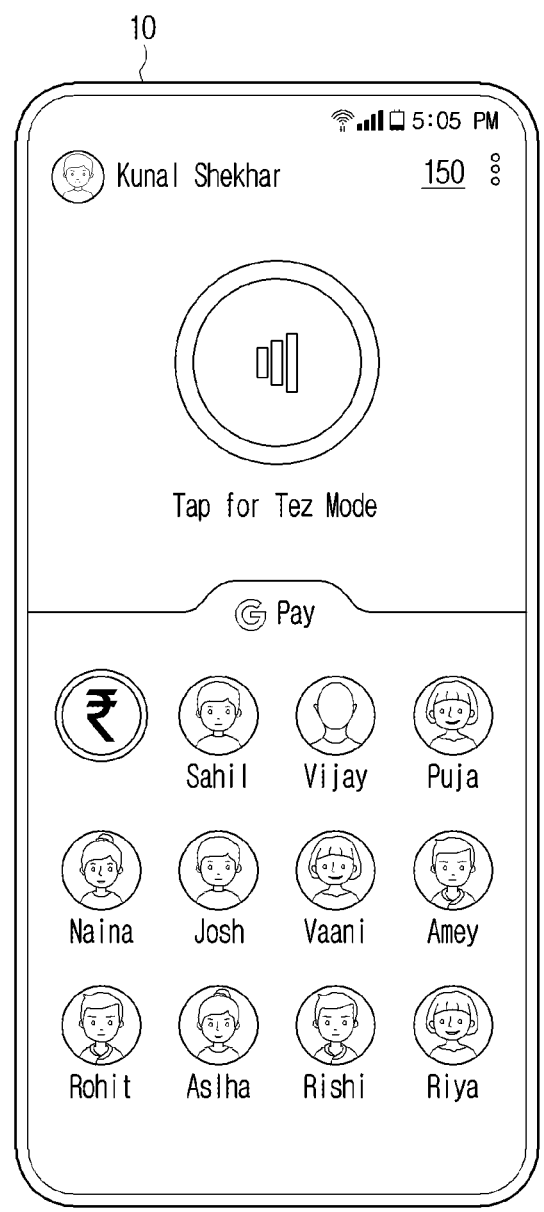
Figure 8D:
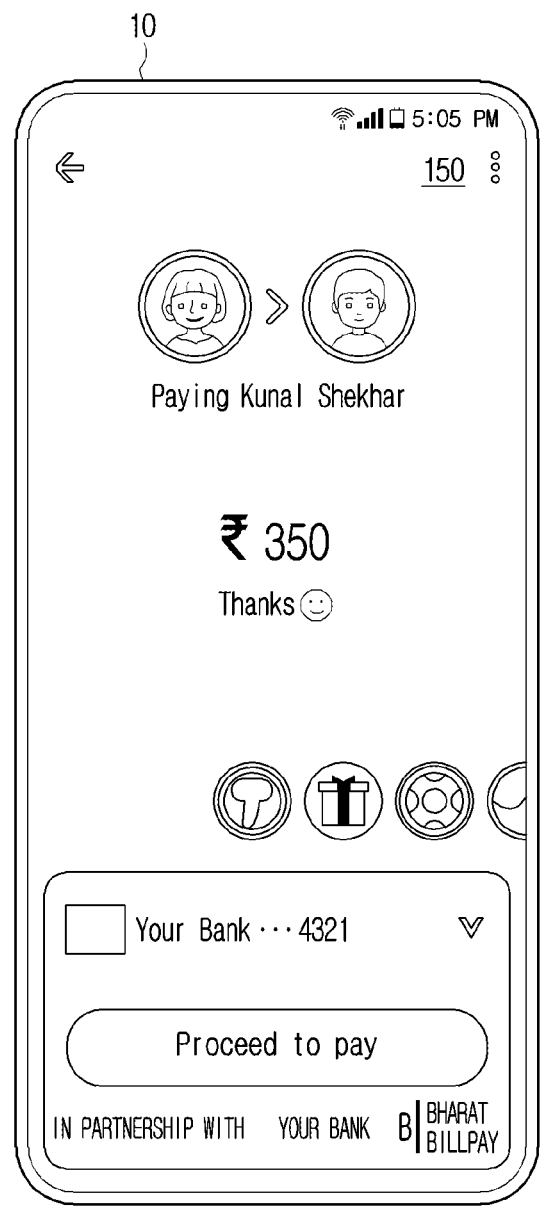

FIGS. 8A, 8B, 8C, 8D, 8E, 8F, 8G, 9A, 9B, 9C, 9D, 9E, 9F, 9G and 9H (which may be referred to as "FIGS. 8A to 9H) are diagrams illustrating an example scenario of transition between a payment application and an instant message application in the existing electronic device (10) and the proposed electronic device (100), according to various embodiments. Transition between the payment application and the instant message application in the existing electronic device (10) is shown in the FIGS. 8A, 8B, 8C, 8D, 8E, 8F and 8G. The conventional smartphone includes the main display (150) is the example of the existing electronic device (10). In FIG. 8A, it is considered that the user (600) taps on an icon of the payment application displayed on the main display (150) of the existing electronic device (10) to launch the payment application. In FIG. 8B, upon receiving the input to launch the payment application, the existing electronic device (10) launches the payment application and displays a request to the user (600) for entering a security code on the main display (150) to authorize the user (600). In FIG. 8C, upon receiving the security code from the user (600) and successfully authorizing the user (600), the existing electronic device (10) displays an option for payment on the main display (150). In FIG. 8D, the user (600) enters an amount for the payment to the payment application, and the existing electronic device (10) displays the amount for the payment on the main display (150).

Figure 8E:
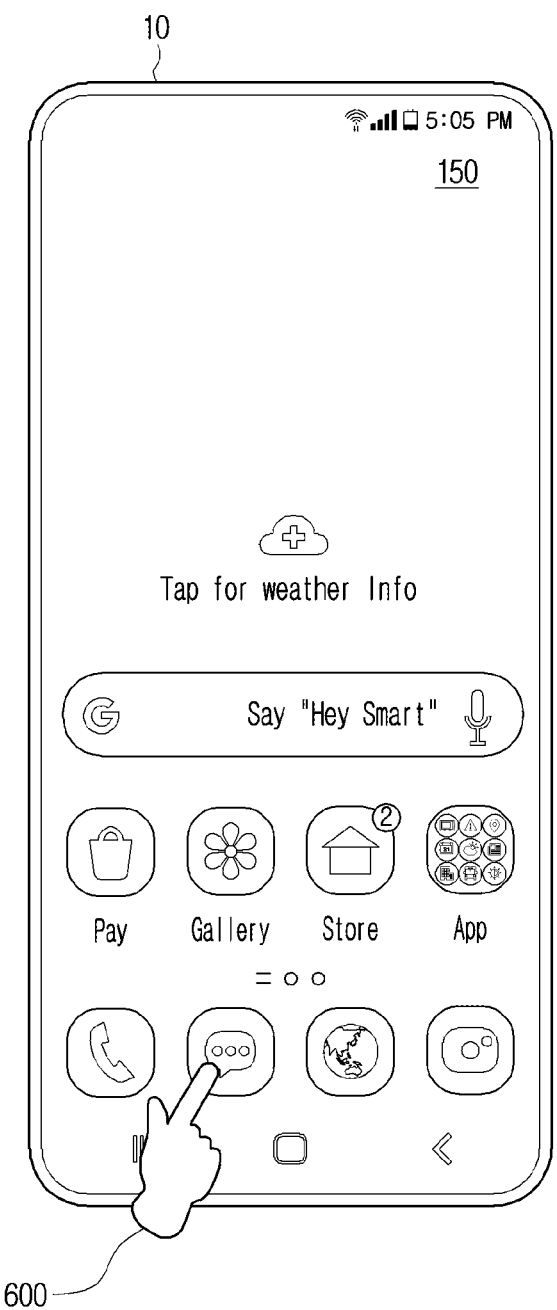
Figure 8F:
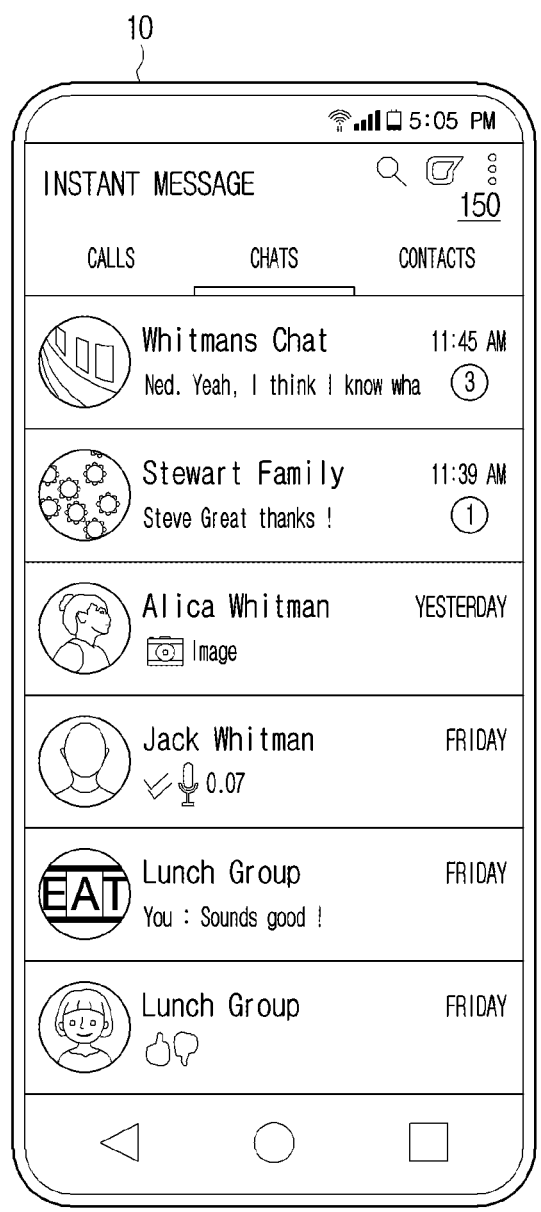
Figure 8G:
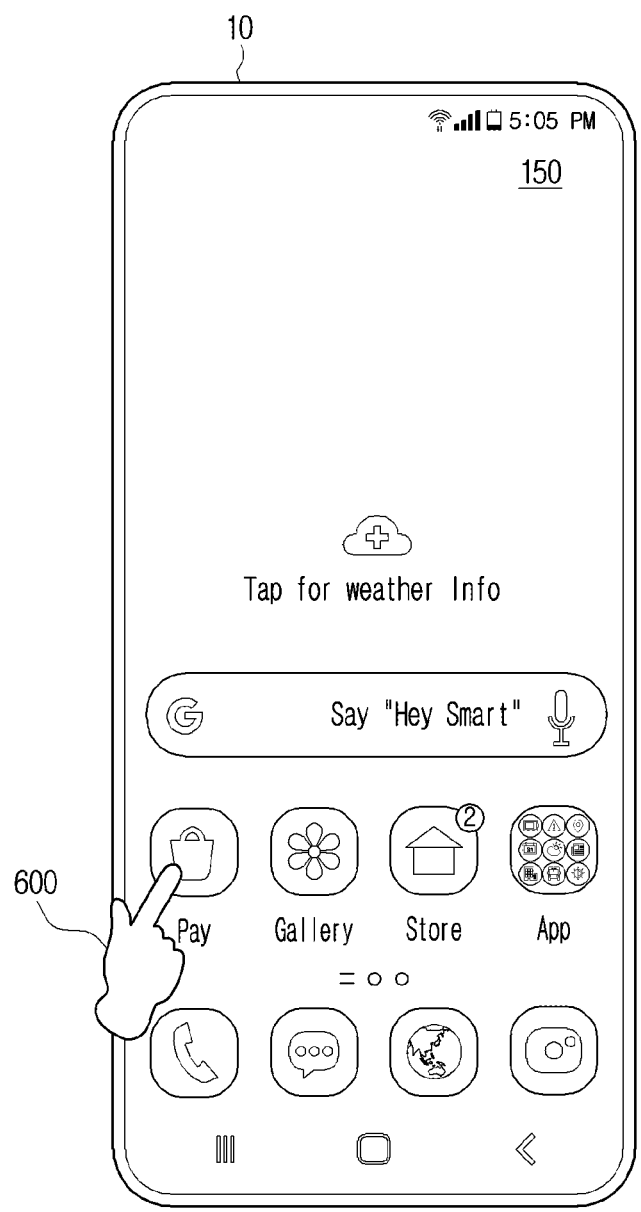

In FIG. 8E, it is considered that the user (600) taps on an icon of the instant message application displayed on the main display (150) of the existing electronic device (10) to launch the instant message application. Upon detecting the launch of the instant message application, the existing electronic device (10) keeps the payment application in the background. Upon detecting that the payment application was kept in the background, the existing electronic device (10) loses current instance of the payment application and discards all progress of the payment reached till the step of FIG. 8D as part of a security feature of the payment application. In FIG. 8F, the existing electronic device (10) launches and displays the instant message application on the main display (150). In FIG. 8G, later if the user (600) wants to continue the payment, the user may need to repeat the operations of FIGS. 8B, 8C and 8D after inputting to launch the payment application, which degrades the user experience.

Figure 9A:
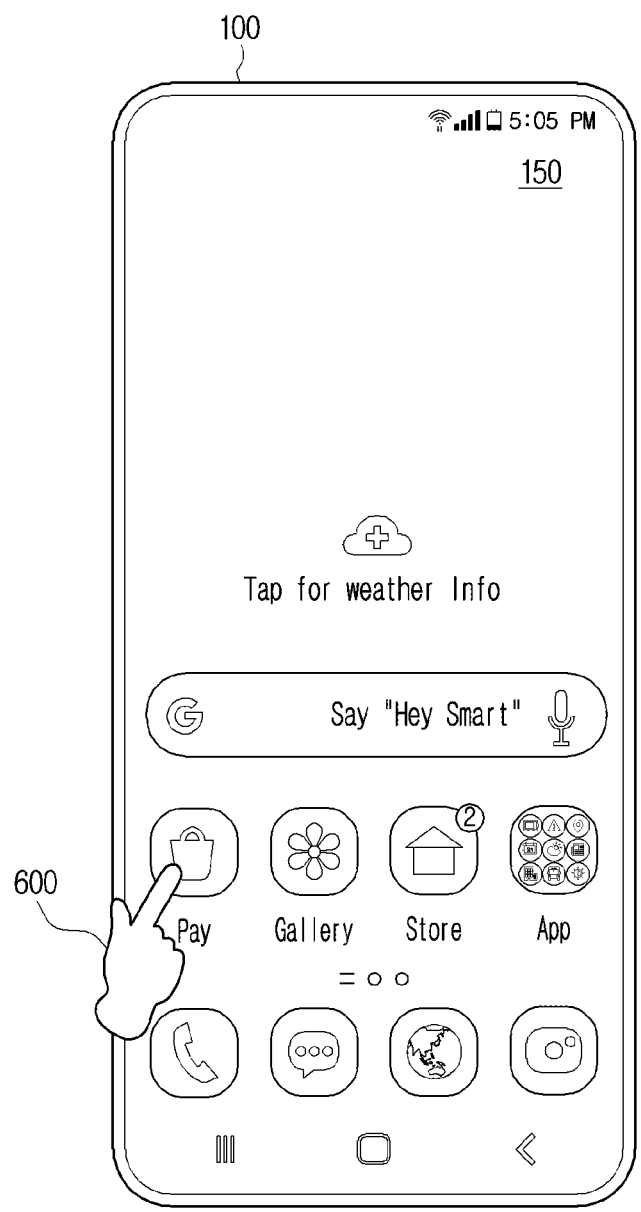
Figure 9B:
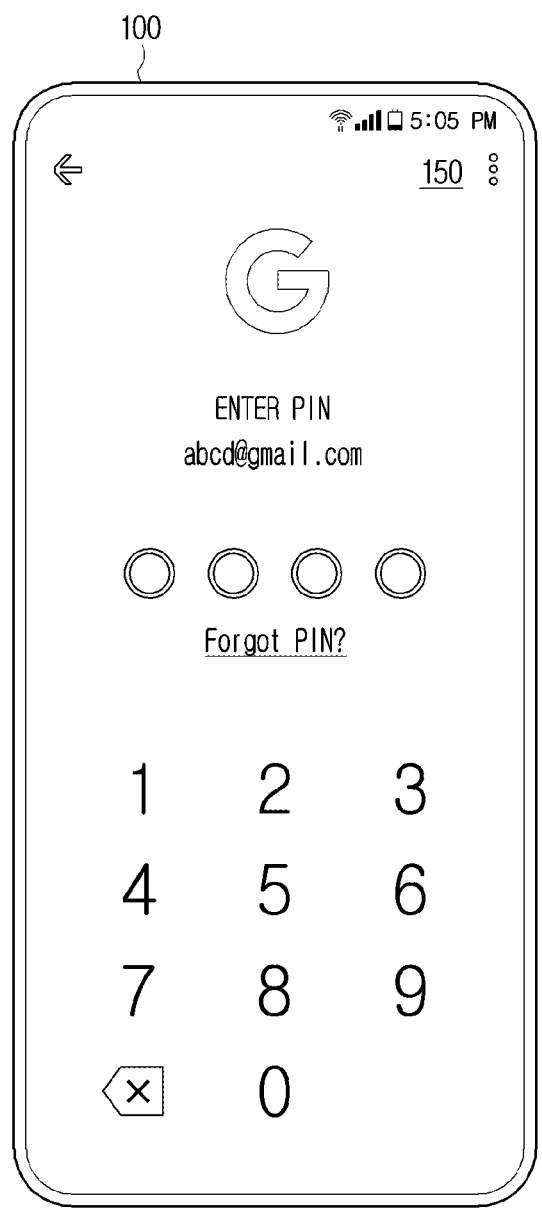
Figure 9C:
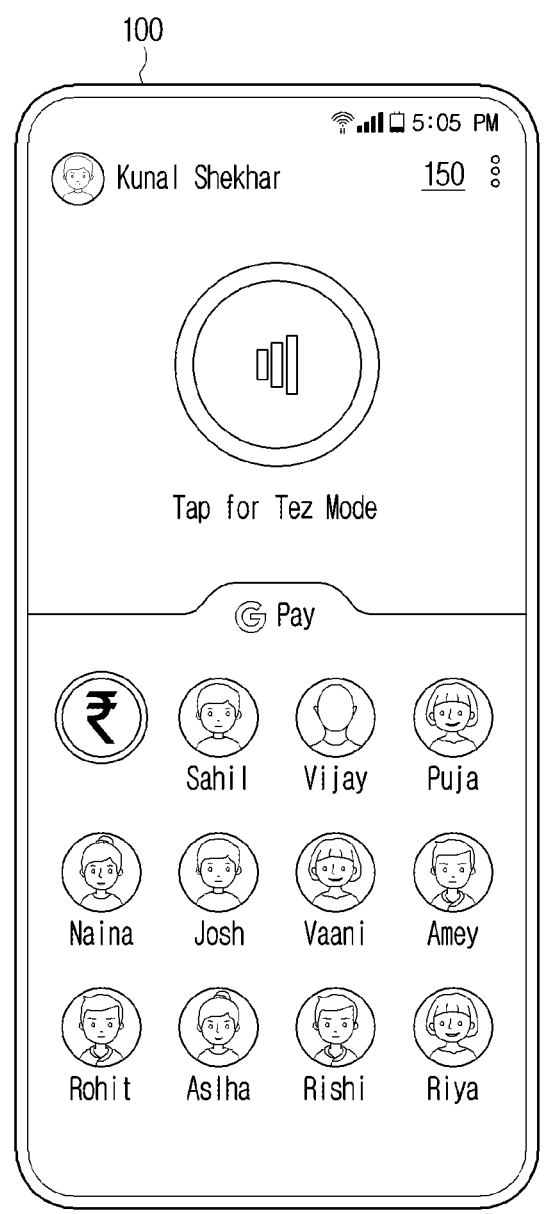
Figure 9D:
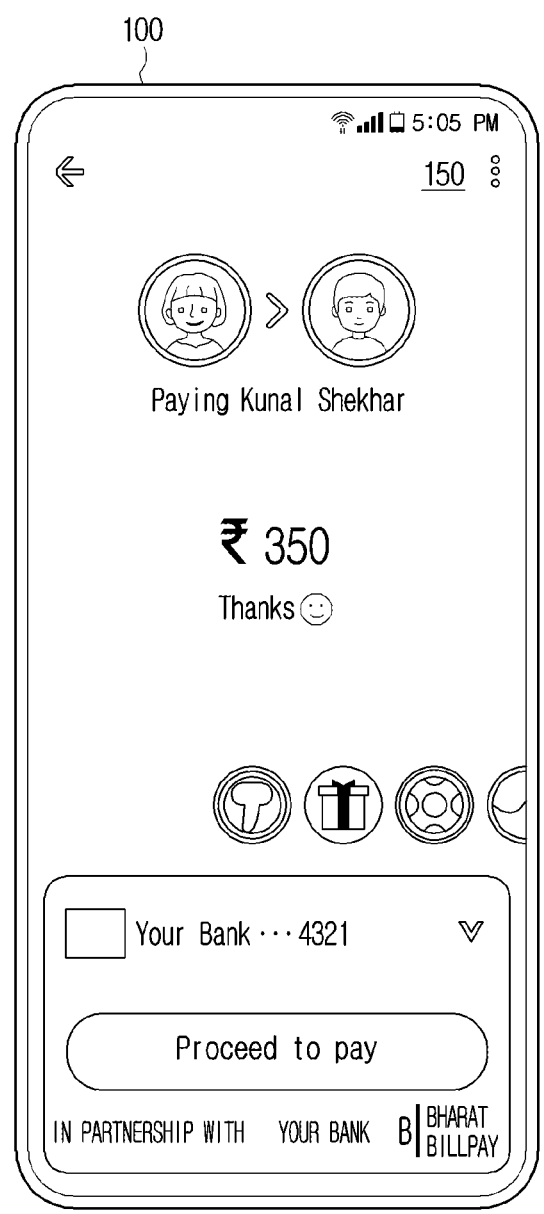

The transition between the payment application and the instant message application in the proposed electronic device (100) is shown in the FIGS. 9A, 9B, 9C, 9D, 9E, 9F, 9G and to 9H. In FIG. 9A, it is considered that the user (600) taps on the icon of the payment application displayed on the main display (150) of the proposed electronic device (100) to launch the payment application. In FIG. 9B, upon receiving the input to launch the payment application, the proposed electronic device (100) launches the payment application and displays the request to the user (600) for entering the security code on the main display (150) to authorize the user (600). In FIG. 9C, upon receiving the security code from the user (600) and successfully authorizing the user (600), the proposed electronic device (100) displays the option for the payment on the main display (150). In FIG. 9D, the user (600) enters the amount for the payment to the payment application, and the proposed electronic device (100) displays the amount for the payment on the main display (150).

Figure 9E:
Figure 9F:
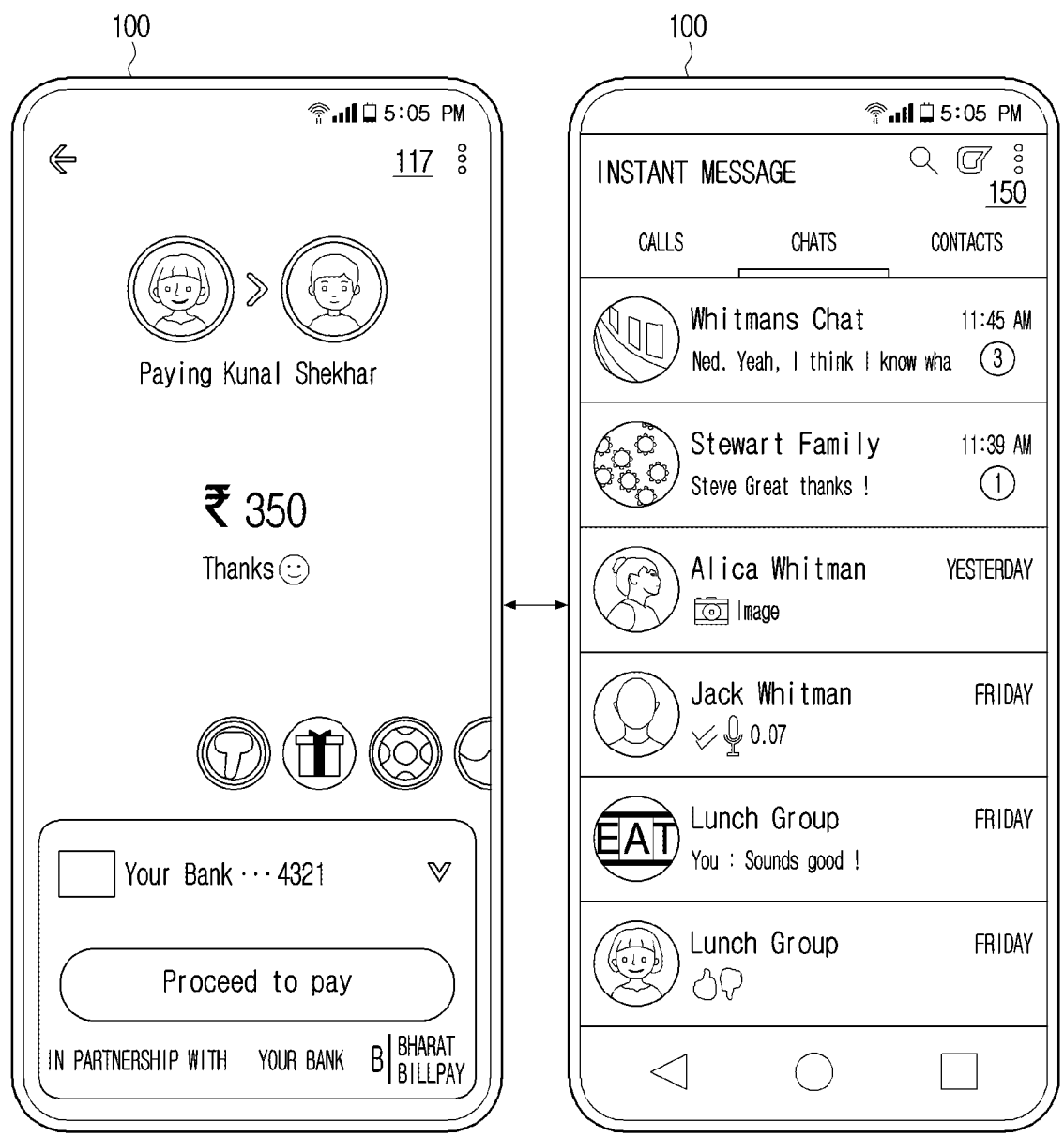
Figure 9G:
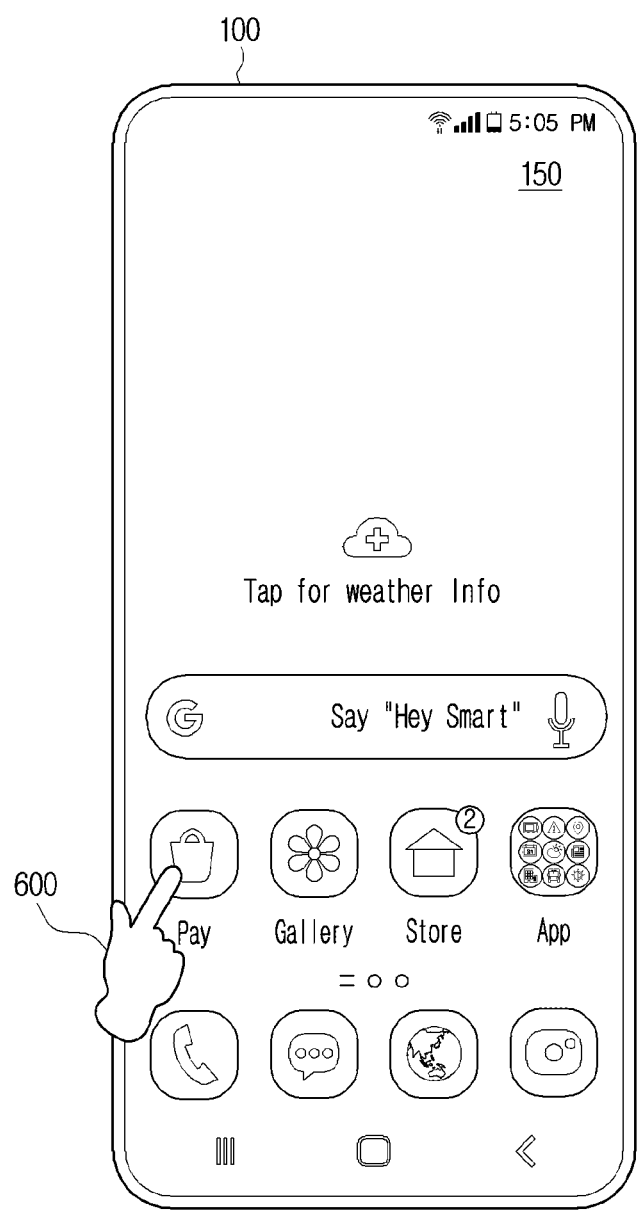
Figure 9H:
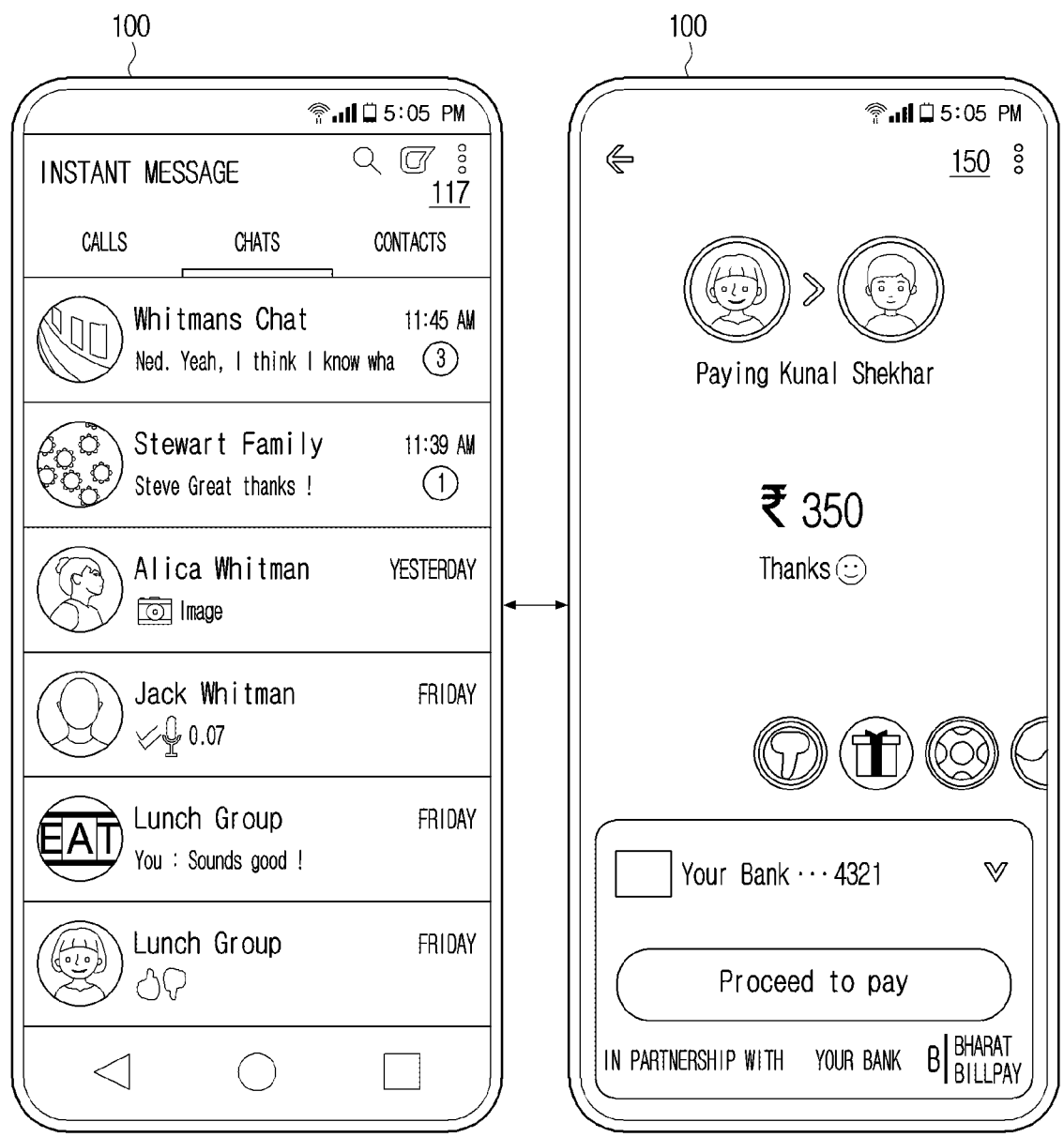

In FIG. 9E, it is considered that the user (600) taps on the icon of the instant message application displayed on the main display (150) of the proposed electronic device (100) to launch the instant message application. Upon detecting the launch of the instant message application, the proposed electronic device (100) saves the current instance of the payment application by moving the payment application with the progress of the payment reached till the step of FIG. 9D to the virtual display (117) instead of keeping the payment application to the background. In FIG. 9F, the proposed electronic device (100) launches and displays the instant message application on the main display (150) and maintains the progress of the payment reached till the operation of FIG. 9D on the virtual display (117). In FIG. 9G, later if the user (600) wants to continue the payment, the user inputs the proposed electronic device (100) to launch the payment application. In FIG. 9H, upon receiving the input to launch the payment application, the proposed electronic device (100) returns the saved instance of the payment application by moving the payment application with the progress of the payment reached till the operation of FIG. 9D displayed on the virtual display (117) to the main display (150), and concurrently moves the instant message application displayed on the main display (150) to the virtual display (117). So that the user need not to repeat the operations of FIGS. 9B, 9C and 9D for the payment after inputting to launch the payment application, and the user can switch between the payment application and the instant message application quickly as per requirement without any delay, which improves a multitasking experience of the user (600).

Figure 10A:
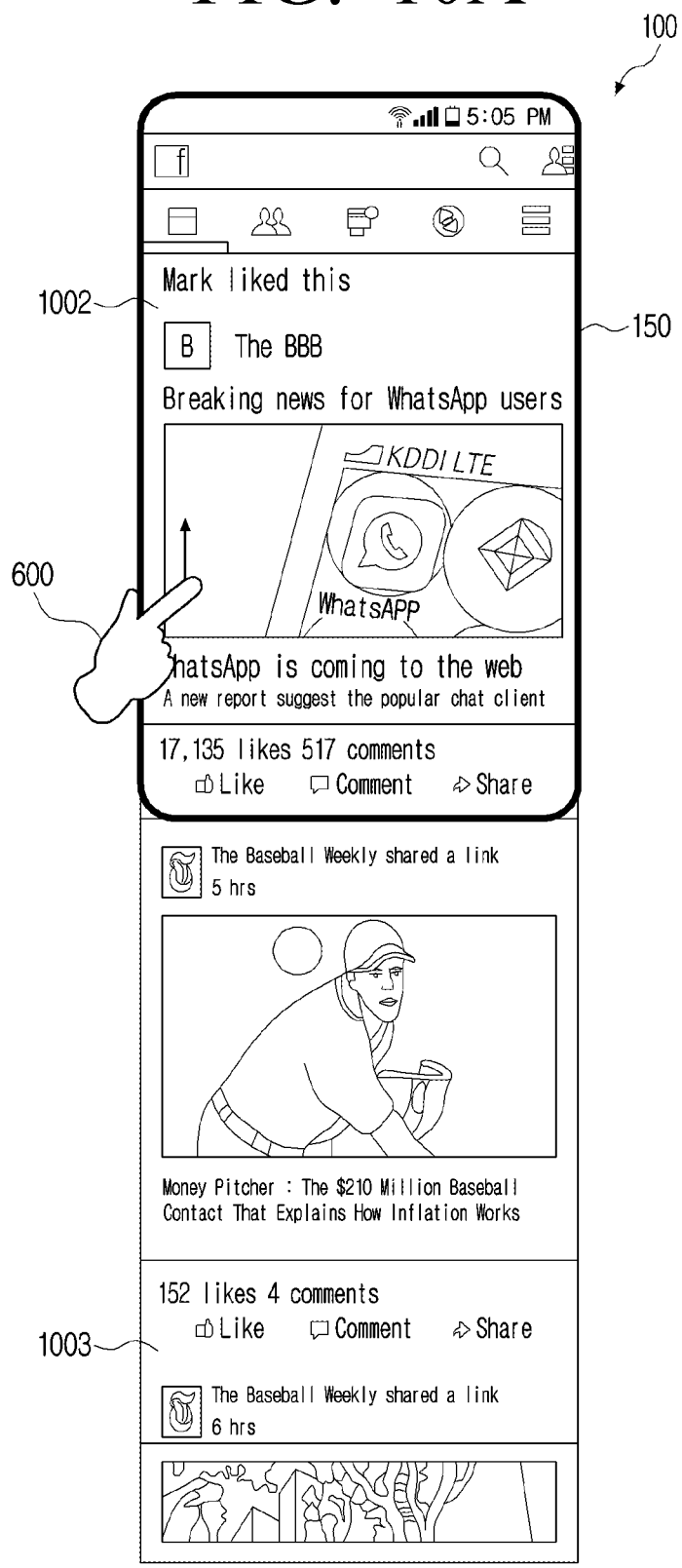
FIGS. 10A and 10B are diagrams illustrating an example scenario of displaying a consecutive portion of a scrollable list in a native application on the virtual display, according to various embodiments.
Figure 10B:
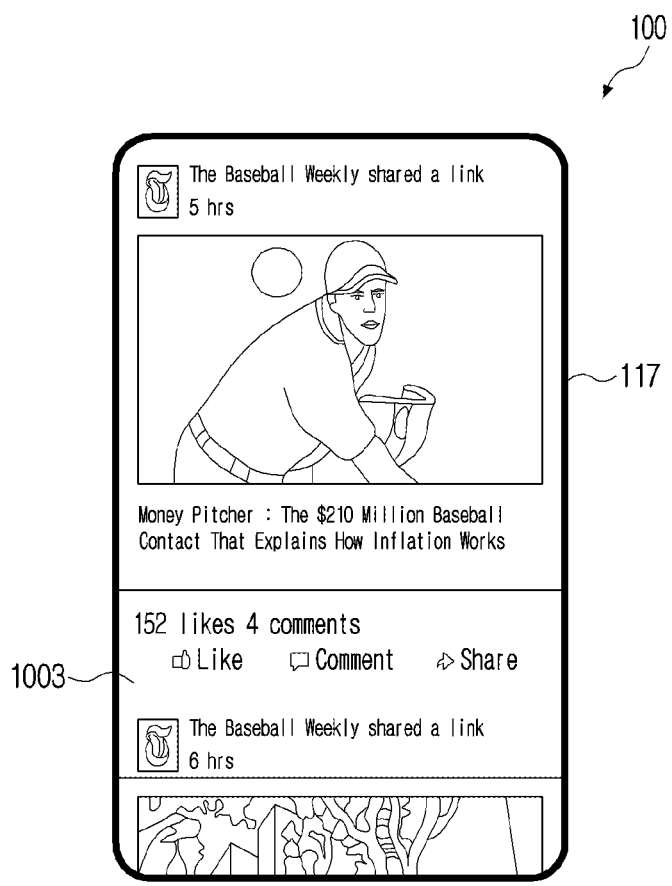

FIGS. 10A and 10B are diagrams illustrating an example scenario of displaying a consecutive portion (1003) of the scrollable list in the native application on the virtual display (117), according to various embodiments. Consider, the user (600) opens the scrollable list of a news portal in a web browser application of the electronic device (100). In FIG. 10A, the electronic device (100) displays a current portion (1002) of the scrollable list contains a news on the main display (150). Further, the electronic device (100) predicts that the user (100) will scroll-up the scrollable list to read next news in the consecutive portion (1003) of the scrollable list based on monitoring the interaction of the user (600). In FIG. 10B, the electronic device (100) creates the virtual display (117), and renders and displays the consecutive portion (1003) of the scrollable list on the virtual display (117) based on the prediction. So that, when the user (100) scrolls-up the scrollable list to read the next news, the electronic device (100) immediately moves the consecutive portion (1003) of the scrollable list displayed on the virtual display (117) to the main display (150) without any delay in displaying the next news, which provides a smooth scrolling experience to the user (600).

Figure 11:
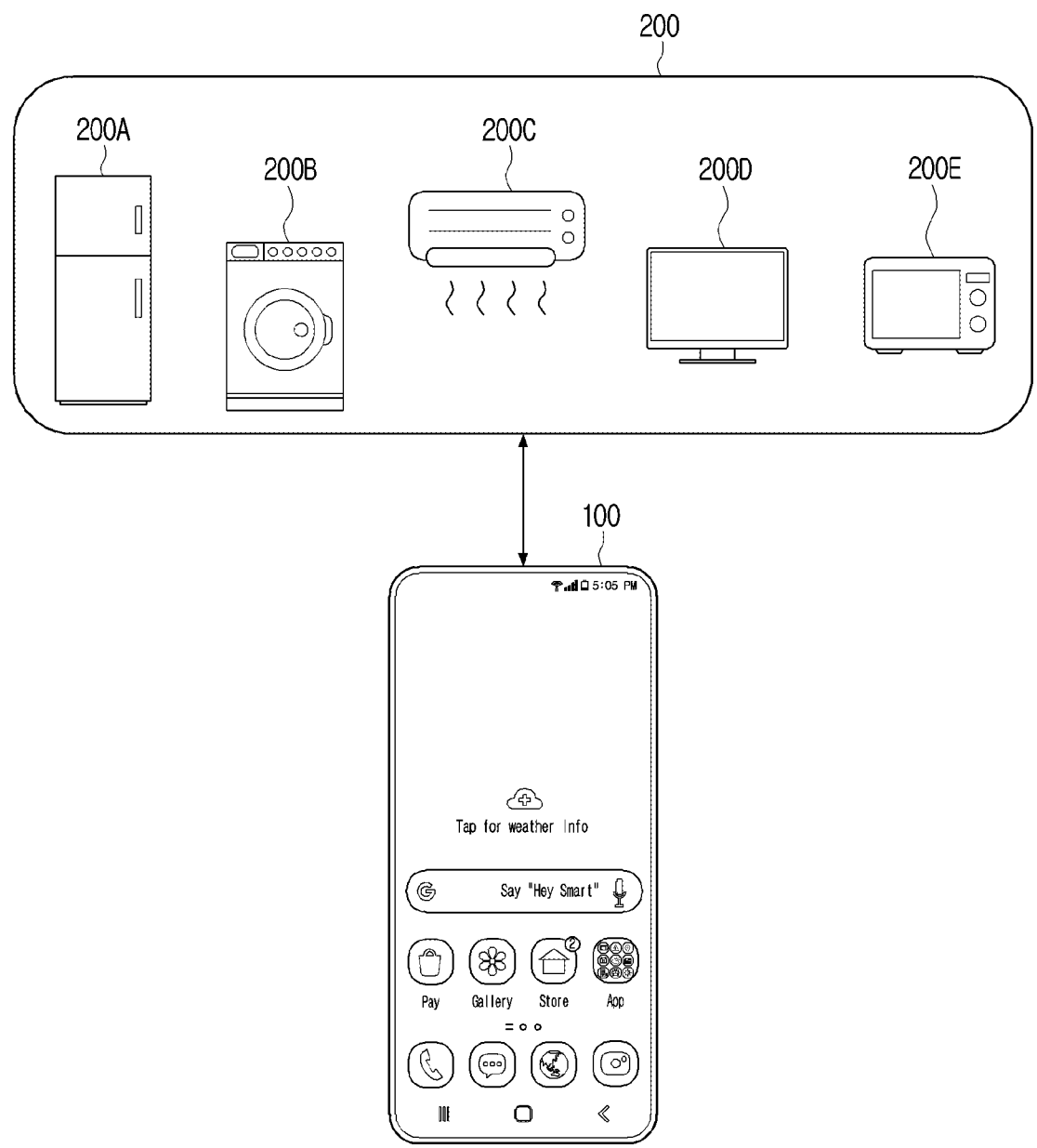
FIG. 11 is a diagram illustrating an example scenario of leveraging computation power of a high computational device by low computational devices for graphical processing, according to various embodiments.

FIG. 11 is a diagram illustrating an example scenario of leveraging computation power of a high computational device by the low computational devices for graphical processing, according to various embodiments. Consider, that the high computational device is the proposed electronic device (100) that is connected to the low computational devices such as IoT devices (200) includes a refrigerator (200A), a washing machine (200B), an air conditioner (200C), a television (200D), an electric oven (200E), etc. Whenever the IoT devices (200) want to perform graphical computations, the IoT devices (200) requests the electronic device (100) to perform the graphical computations. Upon receiving the request, the electronic device (100) prepares graphical components on the virtual display (117) without interrupting the content playing in the main display (150). Further, the electronic device (100) provides the prepared graphical components to the IoT devices (200) for smooth user interface experience.

Figure 12:
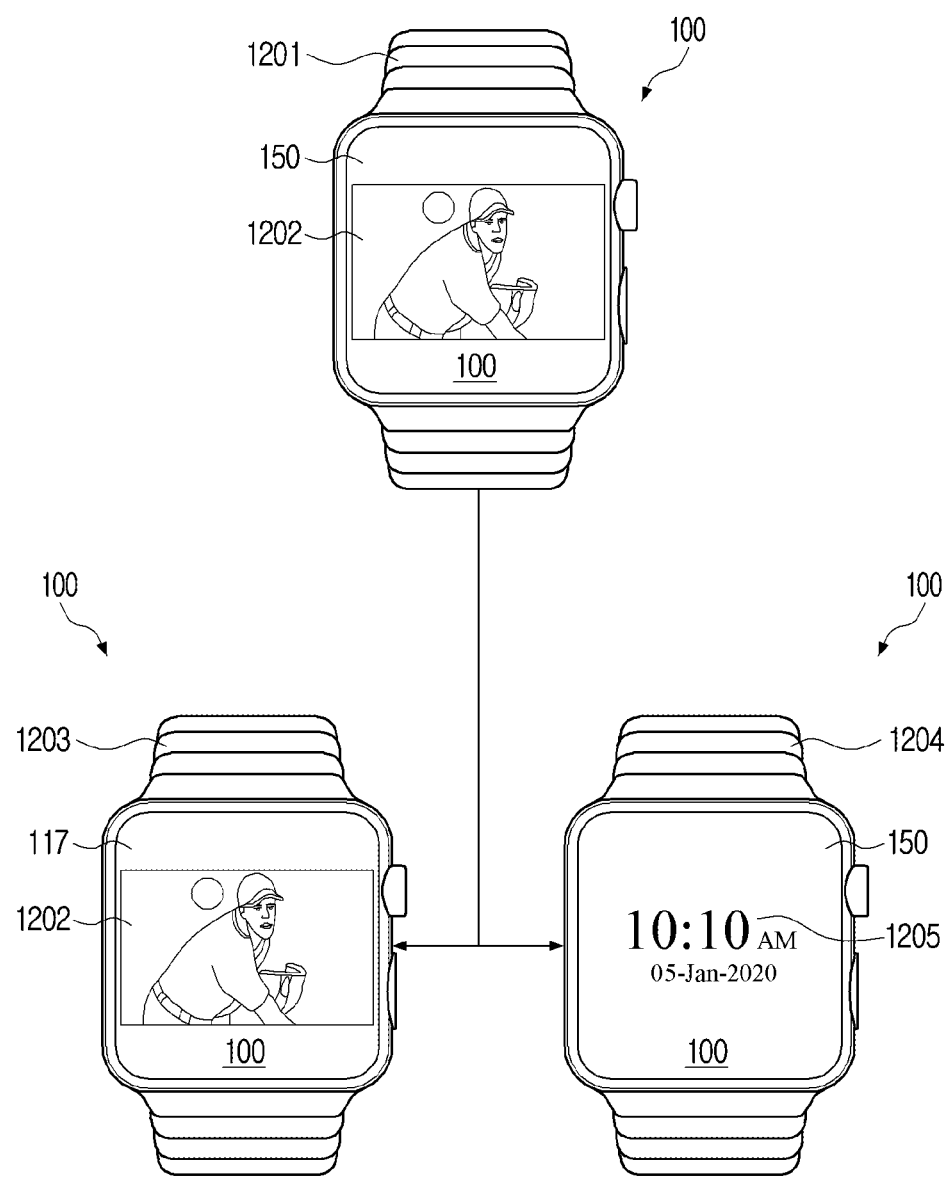
FIG. 12 is a diagram illustrating an example scenario of playing a video on the virtual display without an interruption when a user wants to play the video in background while using other functionalities on the electronic device, according to an embodiment.

FIG. 12 is a diagram illustrating an example scenario of playing a video on the virtual display (117) without the interruption when the user wants to play the video in background while using other functionalities on the electronic device (100), according to various embodiments. Consider, that the electronic device (100) is a smart watch which is a low power device. At 1201, consider the user wants to listen a music in a video (1202), but the user doesn't want to watch the video (1201). If the user plays the video (1202) on the main display (150) for listening the music, then the smart watch drains its battery quickly which is undesired to the low power device. Moving to another application (e.g. clock application) of the low power device will stop the music playback. At 1203, in order to avoid the aforementioned problem in conventional low power devices, the proposed electronic device (100) plays the video (1202) on the virtual display (117) for providing the music to the user without making the interruption to the video playback. Because of not using the main display (150) for playing the video (1202), the proposed electronic device (100) consumes less battery power. At 1204, upon moving to the clock application (1205), the proposed electronic device (100) displays the clock application (1205) on the main display (150) without making the interruption to the video playback on the virtual display (117) and the music playback.

The foregoing description of the various example embodiments will enable others to, by applying current knowledge, readily modify and/or adapt for various applications such embodiments without departing from the general concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the scope of the embodiments as described herein. It will be understood that while the disclosure has been illustrated and described with reference to various example embodiments, the various example embodiments are intended to be illustrative, not limiting. It will also be understood that any of the embodiment(s) described herein may be used in conjunction with any other embodiment(s) described herein.

What is claimed is:

1. A method comprising:
   determining, by a virtual display controller, a context of an electronic device;
   determining, by the virtual display controller, a current state of the electronic device, wherein the current state indicates a real time consumption of hardware components of the electronic device;
   determining, by the virtual display controller, at least one graphics configuration of hardware components of the electronic device and a first application of the electronic device, based on the context of the electronic device and the current state of the electronic device;
   generating, by the virtual display controller, a virtual display for displaying the first application based on the at least one graphics configuration of the hardware components and the first application;

detecting, by the virtual display controller, an input for launching the first application displayed on the virtual display;

switching, by the virtual display controller, display of a second application displayed on a main display of the electronic device to the virtual display and display of the first application from the virtual display to the main display; and determining, by the virtual display controller, a surface requirement for rendering the first application on the virtual display and a final state at run-time of the first application, wherein the determining of the surface requirement includes:

determining one or more first parameters including at least one of a use of the electronic device, available memory, a type of the first application, or a battery level of the electronic device;

normalizing the one or more first parameters into a pre-determined range;

applying the one or more normalized first parameters to a first model; and determining whether to render the first application on the virtual display with or without a surface based on the first model, and wherein the determining of the final state at run-time of the first application includes:

determining one or more second parameters including at least one of network accessibility, the available memory, a size of the first application, or a continuous power draw;

normalizing the one or more second parameters into a pre-determined range;

applying the one or more normalized second parameters to a second model; and determining whether to keep the rendered first application in a hold state in which the first application is compressed and stored in memory or a ready state in which the first application is maintained in a latest state, based on the second model.

2. The method as claimed in claim 1, further comprising:
applying, by the virtual display controller, a current graphics configuration change to the first application;
enabling, by the virtual display controller, the first application for generating an interrupt by controlling the hardware components; and
enabling, by the virtual display controller, the first application for receiving inputs.

3. The method as claimed in claim 2, further comprising:
retaining states of the first and second applications; and
storing an instance state of each application on the virtual display.

4. The method as claimed in claim 2, further comprising:
detecting, by the virtual display controller, scrolling through a list of the second application displayed on the main display; and
rendering, by the virtual display controller, subsequent components of the list on the virtual display.

5. The method as claimed in claim 1, further comprising:
monitoring, by the virtual display controller, interaction with the electronic device over a time period; and
predicting, by the virtual display controller, the context of the electronic device, the context comprising an instant of a future application launch using the first application by the electronic device, based on the monitored interaction.

6. The method as claimed in claim 1, wherein the current state of the electronic device indicates a real-time resource consumption of the hardware components including at least one of a communicator including communication circuitry, a memory, or a power source.

7. The method as claimed in claim 1, further comprising:
determining, by the virtual display controller, whether the hardware components are available for displaying the first application on the virtual display based on the context of the electronic device and the current state of the electronic device;
disabling, by the virtual display controller, the first application from generating an interrupt by controlling the hardware components, in response to determining that the hardware components are available for displaying the first application on the virtual display; and
disabling, by the virtual display controller, the first application from receiving specified inputs.

8. The method as claimed in claim 1, further comprising:
generating, by the virtual display controller, the virtual display; and
displaying, by the virtual display controller, the first application on the virtual display by applying the at least one graphics configuration of the hardware components corresponding to the first application.

9. The method as claimed in claim 8, further comprising:
fetching, by the virtual display controller, a content of the first application from a memory of the electronic device based on the at least one graphics configuration of the first application;
generating, by the virtual display controller, a User Interface (UI) hierarchy using the content;
rendering, by the virtual display controller, the first application based on the UI hierarchy and the at least one graphics configuration of the hardware components corresponding to the first application; and
rasterizing, by the virtual display controller, the first application on the virtual display.

10. An electronic device comprising:
memory;
at least one processor including processing circuitry;
a main display;
a virtual display controller, coupled to the memory and the at least one processor, and configured to:
determine a context of the electronic device,
determine a current state of the electronic device, wherein the current state indicates a real time consumption of hardware components of the electronic device,
determine at least one graphics configuration of hardware components of the electronic device and a first application of the electronic device based on the context of the electronic device and the current state of the electronic device,
generate a virtual display for displaying the first application based on the at least one graphics configuration of the hardware components and the first application,
detect an input for launching the first application displayed in the virtual display;
switch display of a second application displayed on a main display of the electronic device to the virtual display and display of the first application from the virtual display to the main display; and
determine a surface requirement for rendering the first application on the virtual display and a final state at run-time of the first application, wherein the determining of the surface requirement includes:
  determining one or more first parameters including at least one of a use of the electronic device, available memory, a type of the first application, or a battery level of the electronic device;
  normalizing the one or more first parameters into a pre-determined range;
  applying the one or more normalized first parameters to a first model; and
  determining whether to render the first application on the virtual display with or without a surface based on the first model, and
wherein the determining of the final state at run-time of the first application includes:
  determining one or more second parameters including at least one of network accessibility, the available memory, a size of the first application, or a continuous power draw;
  normalizing the one or more second parameters into a pre-determined range;
  applying the one or more normalized second parameters to a second model; and
  determining whether to keep the rendered first application in a hold state in which the first application is compressed and stored in the memory or a ready state in which the first application is maintained in a latest state, based on the second model.

11. The electronic device as claimed in claim 10, wherein the virtual display controller is further configured to:
  apply a current graphics configuration change to the first application;
  enable the first application for generating an interrupt by controlling the hardware components; and
  enable the first application for receiving inputs.

12. The electronic device as claimed in claim 11, wherein the virtual display controller is configured to:
  retain states of the first and second applications; and
  store an instance state of each application on the virtual display.

13. The electronic device as claimed in claim 11, wherein the virtual display controller is configured to:
  detect scrolling through a list of the second application displayed on the main display; and
  render subsequent components of the list on the virtual display.

14. The electronic device as claimed in claim 10, wherein the virtual display controller is configured to:
  monitor interaction with the electronic device over a time period; and
  predict the context of the electronic device, the context comprising an instant of a future application launch using the first application by the electronic device based on the monitored interaction.

15. The electronic device as claimed in claim 10, wherein the current state of the electronic device indicates a real-time resource consumption of the hardware components including at least one of a communicator including communication circuitry, a memory, or a power source.

16. A non-transitory computer-readable storage medium storing instructions which, when executed by at least one processor of an electronic device, cause the at least one processor to control the electronic device to perform operations comprising:
  determining a context of the electronic device;
  determining a current state of the electronic device, wherein the current state indicates a real time consumption of hardware components of the electronic device;
  determining at least one graphics configuration of hardware components of the electronic device and a first application of the electronic device, based on the context of the electronic device and the current state of the electronic device;
  generating a virtual display for displaying the first application based on the at least one graphics configuration of the hardware components and the first application;
  detecting an input for launching the first application displayed in the virtual display;
  switching display of a second application displayed on a main display of the electronic device to the virtual display and display of the first application from the virtual display to the main display; and
  determining, a surface requirement for rendering the first application on the virtual display and a final state at run-time of the first application,
wherein the determining of the surface requirement includes:
  determining one or more first parameters including at least one of a use of the electronic device, available memory, a type of the first application, or a battery level of the electronic device;
  normalizing the one or more first parameters into a pre-determined range;
  applying the one or more normalized first parameters to a first model; and
  determining whether to render the first application on the virtual display with or without a surface based on the first model, and
wherein the determining of the final state at run-time of the first application includes:
  determining one or more second parameters including at least one of network accessibility, the available memory, a size of the first application, or a continuous power draw;
  normalizing the one or more second parameters into a pre-determined range;
  applying the one or more normalized second parameters to a second model; and
  determining whether to keep the rendered first application in a hold state in which the first application is compressed and stored in memory or a ready state in which the first application is maintained in a latest state, based on the second model.

* * * * *